(12) United States Patent
Sato

(10) Patent No.: US 11,467,788 B2
(45) Date of Patent: Oct. 11, 2022

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Shogo Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/740,909

(22) Filed: Jan. 13, 2020

(65) Prior Publication Data

US 2020/0233620 A1 Jul. 23, 2020

(30) Foreign Application Priority Data

Jan. 17, 2019 (JP) .............................. JP2019-006203

(51) Int. Cl.
*G06F 3/12* (2006.01)
*H04N 1/44* (2006.01)

(52) U.S. Cl.
CPC .......... *G06F 3/1238* (2013.01); *G06F 3/1222* (2013.01); *H04N 1/4413* (2013.01)

(58) Field of Classification Search
None
See application file for complete search history.

(56) References Cited

U.S. PATENT DOCUMENTS

| 2012/0147415 A1* | 6/2012 | Hutchings | G06F 3/1285 358/1.15 |
| 2015/0378648 A1* | 12/2015 | Yasukawa | G06F 3/1219 358/1.14 |

FOREIGN PATENT DOCUMENTS

JP 2016-218553 A 12/2016

* cited by examiner

*Primary Examiner* — Dov Popovici
(74) *Attorney, Agent, or Firm* — Canon U.S.A., Inc. IP Division

(57) ABSTRACT

An image forming apparatus includes a storage unit configured to store user information and a print job in association with each other, an operation reception unit configured to receive a user operation, an authentication unit configured to authenticate a user with use of the user information, and a print control unit configured to execute and print the print job stored in association with the user information based on the user operation received by the operation reception unit. In a case where the operation reception unit is in failure, the print control unit executes the print job stored in association with the user information in response to authentication of the user with use of the user information.

16 Claims, 24 Drawing Sheets

FIG.8

UserA:

| DATE | IP ADDRESS | STORAGE | PRINT JOB NAME | PRINT SETTING |
|---|---|---|---|---|
| 2016/4/10 10:34:45 | 192.168.2.11 | /data/0015/xxx | AAA.txt | SINGLE SIDE 1 COPY MONOCHROME |
| 2016/4/20 13:50:22 | 192.168.2.11 | /data/0591/yyy | BBB.pdf | BOTH SIDES 3 COPIES COLOR |
| 2016/5/28 14:10:45 | 192.168.2.11 | /data/8125/zzz | CCC.doc | BOTH SIDES 5 COPIES 2 in 1 COLOR |

FIG.18

< JOB STATUS CHECK SCREEN >

| TIME | JOB NAME | USER NAME | STATUS |
|------|----------|-----------|--------|
| 12:00 | AAA.txt | UserA | IN PRINTING |
| 12:00 | BBB.pdf | UserA | WAIT FOR PRINTING |
| 12:01 | CCC.doc | UserA | WAIT FOR PRINTING |

IMAGE FORMING APPARATUS, METHOD FOR CONTROLLING IMAGE FORMING APPARATUS, AND STORAGE MEDIUM

BACKGROUND

Technical field

The present disclosure relates to an image forming apparatus, a method of controlling the image forming apparatus, and a storage medium.

Description of the Related Art

There is an image forming apparatus including a function called a hold printing for a security purpose. The image forming apparatus does not immediately output a print job input from a printer driver but temporarily stores the print job in a hard disk of the image forming apparatus. After a user logs in, the image forming apparatus displays a list of held print jobs of the user on an operation unit. The image forming apparatus prints a held print job that is selected from the list and instructed to be printed by the user. Further, there is a technique for automatically printing a held print job of a user without an instruction from the user at the time when the user logs in.

On the other hand, there is an image forming apparatus including a function to switch operation when an abnormality occurs in the image forming apparatus. Japanese Patent Application Laid-Open No. 2016-218553 discusses a technique for displaying occurrence of an abnormality when the abnormality of a main central processing unit (CPU) or a power supply system of the image forming apparatus is detected.

SUMMARY

According to an aspect of the present disclosure, an image forming apparatus includes a storage unit configured to store user information and a print job in association with each other, an operation reception unit configured to receive a user operation, an authentication unit configured to authenticate a user with use of the user information, and a print control unit configured to execute and print the print job stored in association with the user information based on the user operation received by the operation reception unit. In a case where the operation reception unit is in failure, the print control unit executes the print job stored in association with the user information in response to authentication of the user with use of the user information.

Further features of the present disclosure will become apparent from the following description of exemplary embodiments with reference to the attached drawings.

BRIEF DESCRIPTION OF THE DRAWINGS

FIG. 8 is a table illustrating an example of a bibliographic information table.

FIG. 18 is an example of a status confirmation screen according to a sixth exemplary embodiment.

DESCRIPTION OF THE EMBODIMENTS

Abnormality of an image forming apparatus includes failure of an operation unit. The failure of the operation unit includes failure of a part relating to a display system that displays information, and failure of a part relating to an operation system that receives a user operation.

In a case where the operation unit of the image forming apparatus is in failure, a print job of hold printing cannot be displayed on the operation unit of the image forming apparatus, or the print job can be displayed but cannot be selected to instruct printing.

The present disclosure is directed to the image forming apparatus that can execute a held print job of a login user even if the operation unit of the image forming apparatus is in failure.

A first exemplary embodiment of the present disclosure is described below with reference to the drawings.

An image forming apparatus 102 according to the present exemplary embodiment includes a function to switch operation of the hold printing depending on whether an operation unit is in failure at the time when the user succeeds in login processing.

Figure 1:
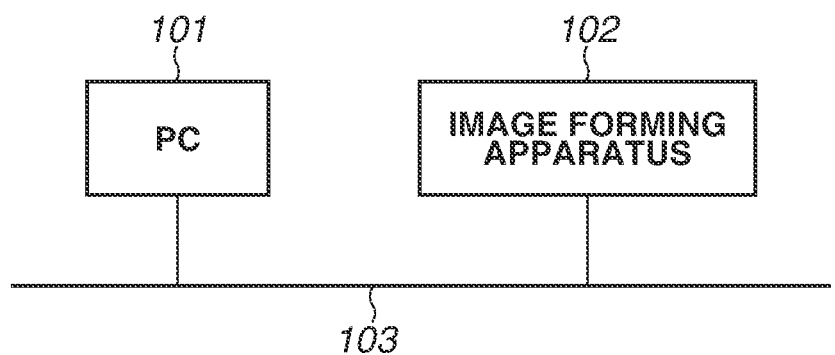
FIG. 1 is a block diagram illustrating an example of a network configuration.

FIG. 1 is a diagram illustrating an example of a network configuration. A personal computer (PC) 101 that inputs a print job and the image forming apparatus (printing apparatus) 102 that processes the input print job are connected to a local area network (LAN) 103. The number of connected PCs and the number of connected image forming apparatuses are not limited thereto. The image forming apparatus 102 manages data of the print job input from the PC 101 and bibliographic information that is information about the print job. In the present exemplary embodiment, an input source of the print job is the PC 101; however, the input source of the print job may also be a device (e.g., mobile terminal or another image forming apparatus) other than the PC.

If user authentication is performed in the image &liming apparatus 102 and the user logs in to the image forming apparatus 102, the image forming apparatus 102 acquires, from the bibliographic information, a list of print jobs printable by the login user, and displays the list on the operation unit. If the user selects a desired print job from the list and instructs printing of the job, the image forming apparatus 102 acquires and prints data of the selected print job.

Figure 2:
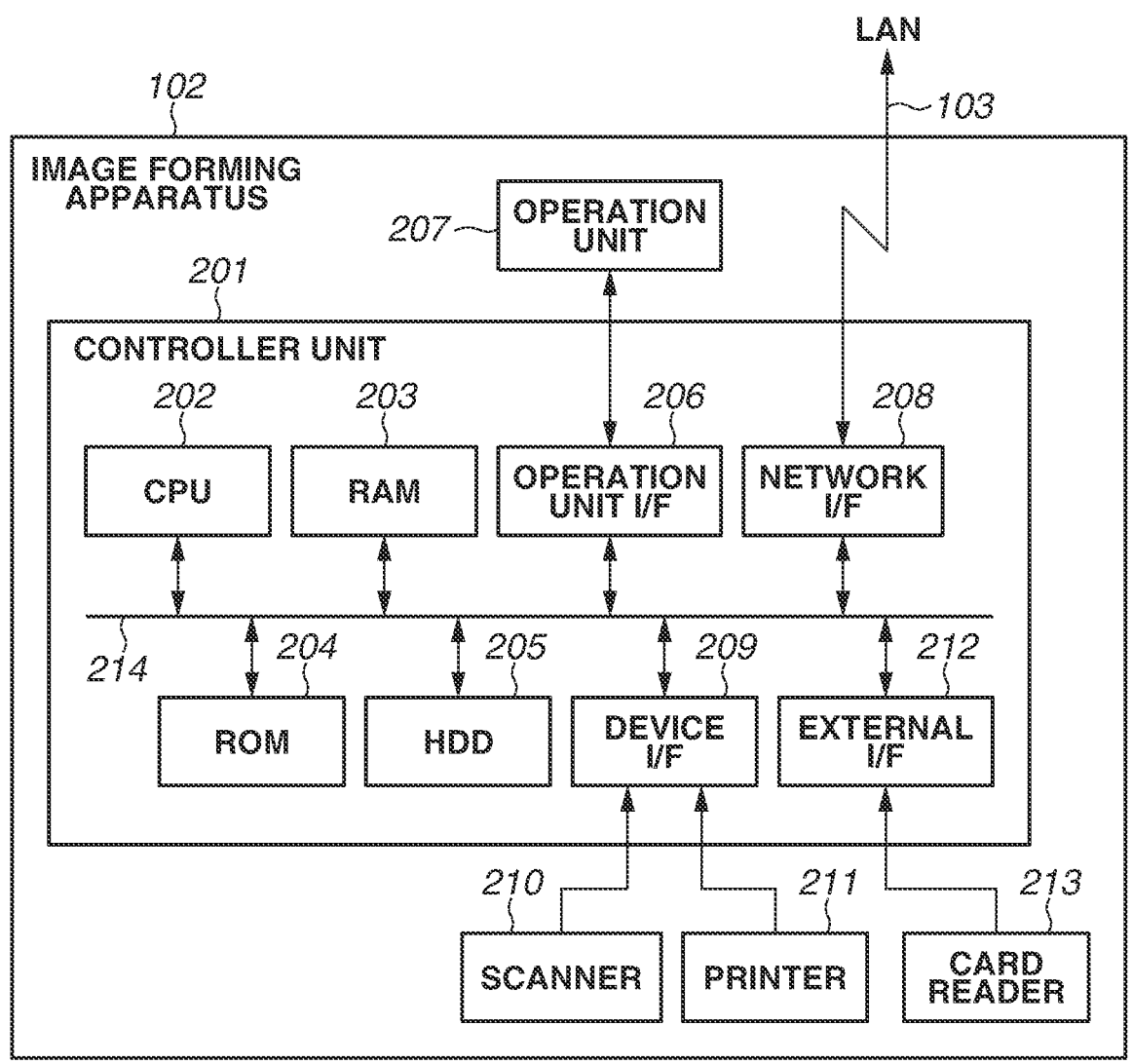
FIG. 2 is a block diagram illustrating an entire configuration of an image forming apparatus.

FIG. 2 is a block diagram illustrating an entire configuration of the image forming apparatus 102. In a controller unit 201 inside the image forming apparatus 102, a central processing unit (CPU) 202 is a calculation device controlling an entire system. A random access memory (RAM) 203 is a system work memory for operation of the CPU 202, and is an image memory to temporarily store image data. The RAM 203 also stores programs and data such as an operating system, system software, and application software. A read-only memory (ROM) 204 stores a boot program of the system. A hard disk drive (HDD) 205 stores the operating system, the system software, the application software, the image data, and setting data.

An operation unit interface (I/F) 206 is an interface unit with an operation unit 207 and outputs, to the operation unit 207, information to be displayed on the operation unit 207. The operation unit I/F 206 also receives information input by the user from the operation unit 207. In other words, the operation unit 207 can display information and receive operation by the user.

A network I/F 208 is connected to the network (LAN) 103, and inputs and outputs information to and from the PC and the other image forming apparatus connected to the same LAN. A device I/F 209 connects a scanner 210 and a printer 211, which are image input and output devices, with the controller unit 201 to input and output the image data.

An external I/F 212 is an I/F unit that receives an input from an external device via a universal serial bus (USB), Institute of Electrical and Electronics Engineers (IEEE) 1394, a printer port, Recommended Standard 232 version C (RS-232C), or the like. In the present exemplary embodiment, a card reader 213 that reads an integrated circuit (IC) card necessary for authentication is connected to the external I/F 212. Through the external I/F 212, reading of authentication information from the IC card by the card reader 213 is controlled, and the authentication information read from the IC card is acquired. Not limited to the IC card, any storage medium allowing for specification of the user can be used. In this case, the storage medium stores identification information for identification of the user. The identification information may be a serial number of the storage medium or a user code given to each user within a company. The card reader 213 reads the authentication information stored in the IC card (e.g., Felica® available from Sony Corporation) under the control of the CPU 202, and notifies the CPU 202 of the read authentication information through the external I/F 212. The above-described devices are placed on a system bus 214.

Figure 3:
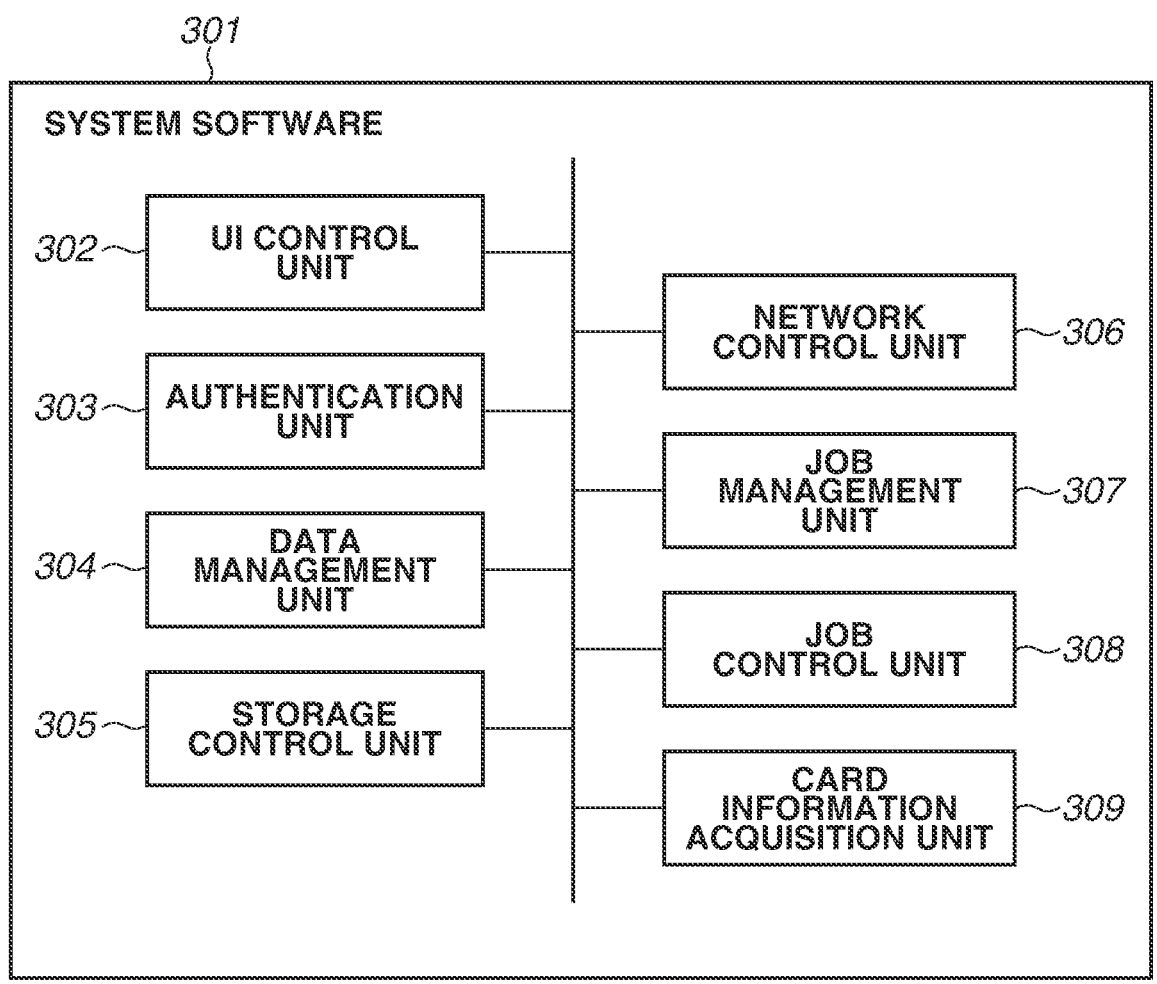
FIG. 3 is a block diagram illustrating a functional configuration of system software of the image forming apparatus.

FIG. 3 is a block diagram illustrating a functional configuration of the system software 301 of the image forming apparatus 102. The system software 301 is stored in any of the RAM 203, the ROM 204, and the HDD 205, and is executed by the CPU 202.

A user interface (UI) control unit 302 receives information input by the user on the operation unit 207 through the operation unit I/F 206, and transmits the information to an authentication unit 303, a data management unit 304, and a job management unit 307. Conversely, the UI control unit 302 receives a response from the authentication unit 303, the data management unit 304, or the job management unit 307, and outputs information about the response to the operation unit 207 through the operation unit I/F 206.

A card information acquisition unit 309 detects that the IC card is held over the card reader 213, reads and acquires the authentication information stored in the IC card, and transmits the authentication information to the authentication unit 303.

The authentication unit 303 performs authentication processing based on the authentication information received from the UI control unit 302 and the card information acquisition unit 309, and returns a result of the authentication processing.

The data management unit 304 receives a data writing request or a data reading request from the UI control unit 302, a network control unit 306, and the job management unit 307, and transmits the data writing request or the data reading request to a storage control unit 305. Conversely, the data management unit 304 receives a response from the storage control unit 305, and transmits information about the response to the UI control unit 302, the network control unit 306, and the job management unit 307.

The storage control unit 305 receives the data writing request or the data reading request from the data management unit 304, writes or reads data to or from the HDD 205, and returns a result of the data writing or the data reading to the data management unit 304.

The network control unit 306 receives a request from the PC 101 or any image forming apparatus connected to the LAN 103 through the network I/F 208. Then, the network control unit 306 requests the data management unit 304 or the job management unit 307 to perform processing depending on the received request. Conversely, the network control unit 306 receives a response from the data management unit 304 or the job management unit 307. Then, the network control unit 306 transmits the received response to the PC 101 or the image forming apparatus connected to the LAN 103 through the network I/F 208.

The job management unit 307 receives a job execution request from the UI control unit 302 or the network control unit 306, and manages a job. Then, the job management unit 307 requests a job control unit 308 to execute the job, or transmits a data writing request or a data reading request to the data management unit 304. Further, the job management unit 307 receives a response from the data management unit 304 or the job control unit 308, and transmits a status of the job to the UI control unit 302 and the network control unit 306.

The job control unit 308 receives the job execution request from the job management unit 307, and controls operation of each of the scanner 210 and the printer 211 through the device I/F 209. Conversely, the job control unit 308 receives an operation state of each of the scanner 210 and the printer 211 through the device I/F 209, and transmits the operation states to the job management unit 307.

Figure 4:
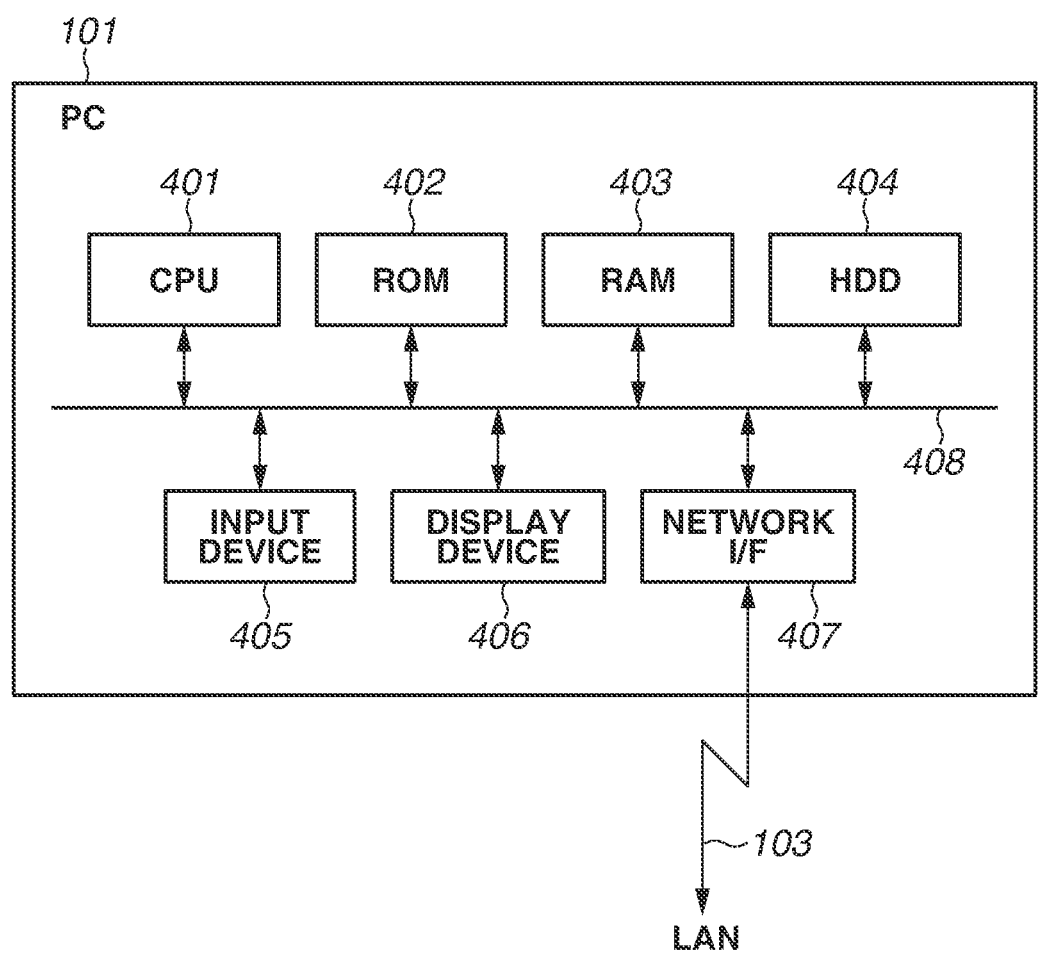
FIG. 4 is a block diagram illustrating an entire configuration of a personal computer (PC).

FIG. 4 is a block diagram illustrating an entire configuration of the PC 101. In the PC 101, a CPU 401 is a calculation device controlling an entire system. A ROM 402 stores programs and data relating to processing. A RAM 403 is a system work memory for operation of the CPU 401, and is a storage memory storing temporary data relating to the processing. An HDD 404 stores programs, data, temporary data, and application data relating to the processing. An input device 405 includes a keyboard and a pointing device for receiving input of an instruction to the apparatus. A display device 406 displays an operation state of the apparatus and information output from each of the programs operated in the apparatus. A network I/F 407 is connected to the network (LAN) 103, and inputs and outputs information to and from another PC and the image forming apparatus connected to the same LAN. The above-described components are placed on a system bus 408.

When the CPU 401 performs processing based on programs corresponding to an operating system (OS), a printer driver, and an application that are stored in the HDD 404, functions (or processing) by the OS and the printer driver are implemented.

Figure 5:
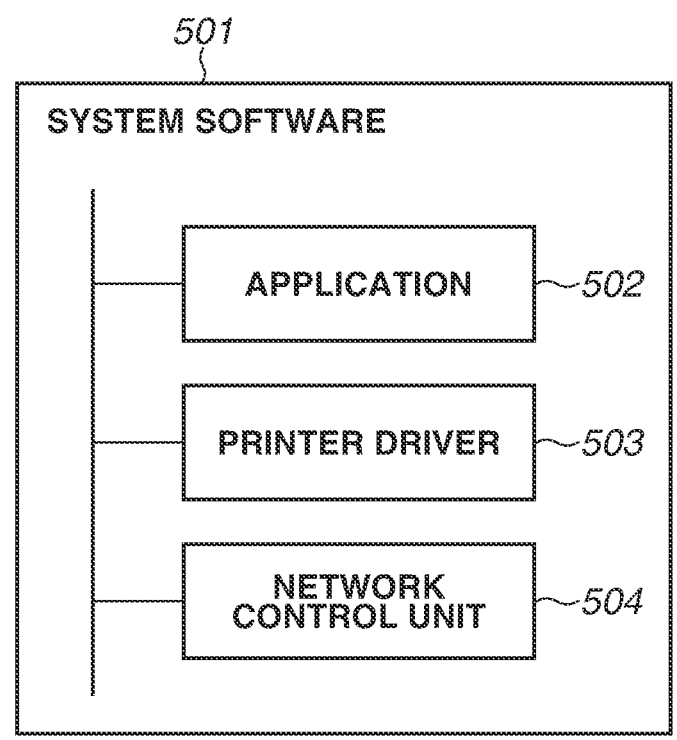
FIG. 5 is a block diagram illustrating a configuration of system software of the PC.

FIG. 5 is a block diagram illustrating a configuration of system software of the PC 101. System software 501 is stored in any of the ROM 402, the RAM 403, and the HDD 404, and is executed by the CPU 401.

The system software 501 includes an application 502, a printer driver 503, and a network control unit 504. For example, the application 502 is a tool for the user to create and edit an image and a document with use of the input device 405 such as the pointing device and the keyboard while the user views the display device 406 of the PC 101. The application 502 is also a tool for referring to information inside the image forming apparatus 102. The user creates data such as an image and a document with use of the application 502, creates print instruction data with use of the printer driver 503, and transmits the print instruction data to the image forming apparatus 102 through the network control unit 504. On the other hand, the user acquires and refers to the information from the image forming apparatus 102 through the network control unit 504.

Figure 6:
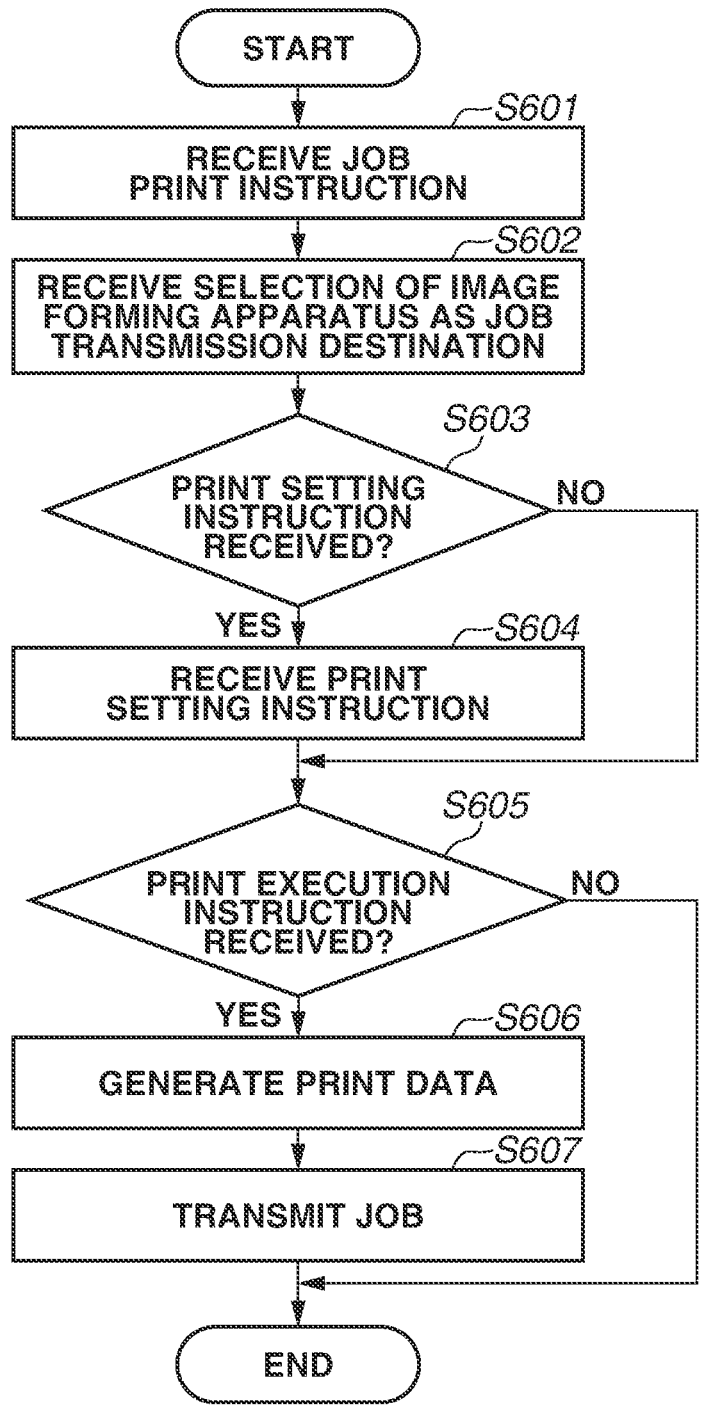
FIG. 6 is a flowchart illustrating print job input processing.

FIG. 6 is a flowchart illustrating print job input processing executed by the CPU 401 of the PC 101. In the present exemplary embodiment, a print job is input from the PC 101 to the image forming apparatus 102, which is a storage device.

The user uses the input device 405 such as the pointing device and the keyboard to create data such as of an image and a document by using the application 502 while viewing the display device 406, and instructs printing. In step S601, when receiving a print instruction, the application 502 displays, on the display device 406, a screen to prompt the user to select an image forming apparatus as a transmission destination of a print job. In step S602, the application 502 receives the selection of the image forming apparatus 102 as the transmission destination of the print job from the user. Then, in step S603, the application 502 determines whether a print setting instruction has been received from the user. In a case where the print setting instruction has not been received (NO in step S603), the processing proceeds to step S605. In a case where the print setting instruction has been received (YES in step S603), a setting screen of the printer driver 503 corresponding to the image forming apparatus 102 is displayed. In step S604, the application 502 receives the print setting instruction by the user. Then, in step S605, the application 502 determines whether print execution instruction has been received. In a case where the application 502 determines that the print execution instruction has been received (YES in step S605), the application 502 requests the printer driver 503 corresponding to the selected image forming apparatus to generate data. In step S606, the printer driver 503 generates page description language (PDL) data based on the data such as of an image and a document, a document attribute such as a document name, the print setting, and a user name. In step S607, the generated PDL data is transmitted as a print job to the image forming apparatus 102.

Figure 7:
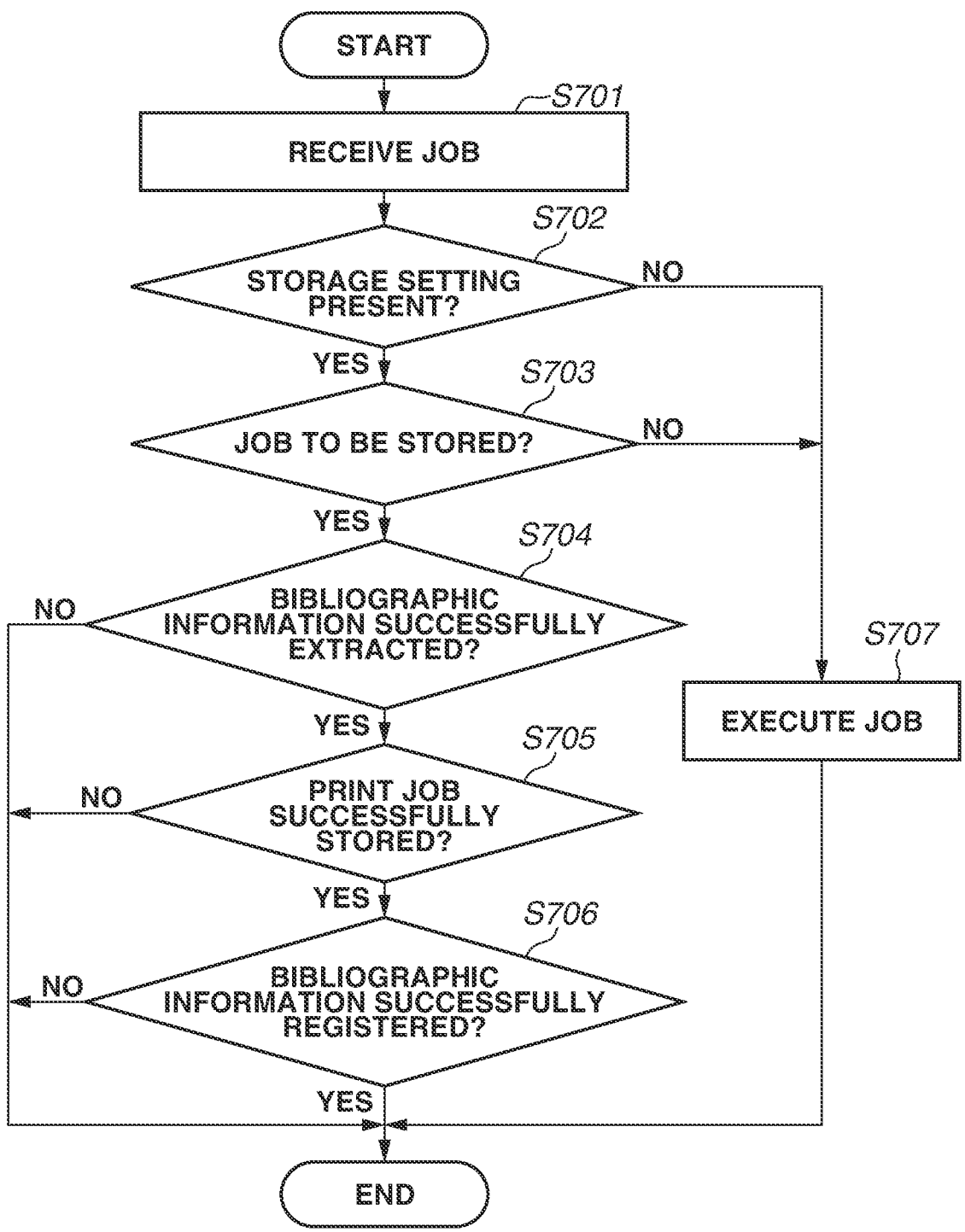
FIG. 7 is a flowchart illustrating print job store processing.

FIG. 7 is a flowchart illustrating print job store processing performed by the system software 301 executed by the CPU 202 of the image forming apparatus 102.

In step S701, when receiving a print job from the PC 101, the network control unit 306 transmits the print job to the job management unit 307. In step S702, when receiving the print job, the job management unit 307 determines whether print job storage setting is present in the image forming apparatus 102. The print job storage setting is set for each image forming apparatus, and the storage control unit 305 stores the print job storage setting in the HDD 205 or the RAM 203. In a case where the print job storage setting is not present (NO in step S702), the job management unit 307 requests the job control unit 308 to execute the print job in step S707, and printing is performed.

In a case where the print job storage setting is present (YES in step S702), in step S703, the job management unit 307 analyzes the print job to determine whether the print job is a job to be stored. The job is determined as the job to be stored, for example, in a case where information given to the print job, such as a print job name, a print job user name, and identification information about a print job execution PC, matches a predetermined condition. Conversely, the job may be determined as the job to be stored in a case where the information given to the print job does not match the predetermined condition. In a case where the job is not the job to be stored (NO in step S703), the job management unit 307 requests the job control unit 308 to execute the print job in step S707, and printing is performed.

In a case where the print job is the job to be stored (YES in step S703), the job S704, the data management unit 304 analyzes the print job received from the job management unit 307 and extracts bibliographic information. Then, the data management unit 304 transmits the print job and the extracted bibliographic information to the storage control unit 305. In step S705, the storage control unit 305 stores the received print job in the HDD 205. Then, in step S706, the storage control unit 305 stores the extracted bibliographic information in the HDD 205 in association with the user.

FIG. 8 is a table illustrating an example of a bibliographic information table. A bibliographic information table 801 of a user UserA includes a date 802 when the print job has been input, an internet protocol (IP) address 803 of the image forming apparatus to which the print job has been input, a storage 804 of the input print job, a print job name 805, and a print setting 806. In a case where the processing fails in the processing in step S704, step S705, or step S706 due to, for example, shortage of a free space in the HDD 205, the processing ends. In a case where the bibliographic information is successfully registered, the processing ends. The print job storage processing is performed through the above-described processing.

Figure 9:
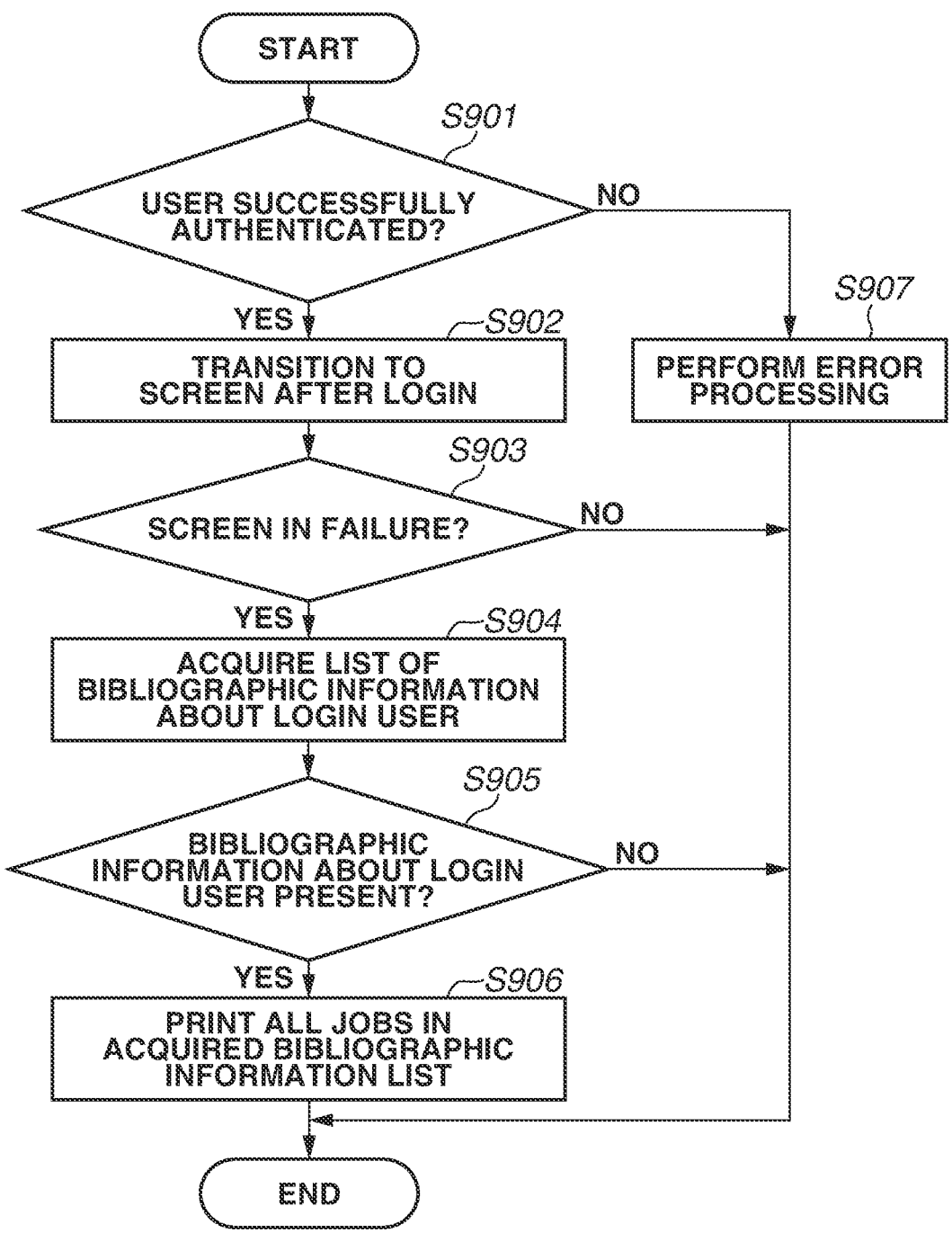
FIG. 9 is a flowchart illustrating automatic printing after a login.

FIG. 9 is a flowchart illustrating print processing when the user is authenticated, performed by the system software 301 executed by the CPU 202 of the controller unit 201.

In step S901, the authentication unit 303 performs authentication processing of the user based on the information input by the user on the operation unit 207, the authentication information received from the card information acquisition unit 309, and a user management table stored in the HDD 205, and confirms whether the user has been successfully authenticated. In a case where the user has failed in authentication (NO in step S901), in step S907, the authentication unit 303 performs error processing, and the processing ends. In a case where the user has been successfully authenticated (YES in step S901), the authentication unit 303 notifies the UI control unit 302 of success of the authentication processing and information about the login user. In step S902, the UI control unit 302 receives a notification of the success of the authentication processing from the authentication unit 303, and then transitions a screen displayed on the operation unit 207 to a screen after a login. The screen after a login is a screen set by the user in advance, and is, for example, a function list (menu) screen (FIG. 22) for selecting a function to be used from among a plurality of functions, or a print function screen (FIG. 23) for printing a held print job.

After the screen is transitioned to the screen after a login by the UI control unit 302 in step S902, in step S903, the UI control unit 302 checks whether the operation unit 207 is in failure based on diagnostic information about screen failure (operation unit failure) stored in the RAM 203. The diagnostic information about the screen failure is stored in the RAM 203 when failure diagnosis processing in a flowchart of FIG. 11 described below is performed.

In a case where the operation unit 207 is not in failure (NO in step S903), the processing ends. In a case where the operation unit 207 is in failure (YES in step S903), in step S904, a list of bibliographic information associated with the information about the login user is acquired from the data management unit 304. Then, in step S905, the UI control unit 302 determines whether the bibliographic information is present. In a case where the bibliographic information is not present (NO in step S905), the processing ends. In a case where the bibliographic information is present (YES in step S905), in step S906, the UI control unit 302 requests the job management unit 307 to perform printing based on the acquired bibliographic information. The job management unit 307 transmits the received print request to the job control unit 308, and the job control unit 308 performs printing based on the received print request.

As described above, according to the flowchart, in the case where the user logs in while the operation unit 207 is in failure, the held print job associated with the login user is automatically printed without a print instruction from the user. In descriptions below, the processing is referred to as processing of automatic printing during failure of the operation unit.

A procedure is described in a case where the user operates the operation unit 207 to execute printing after it is determined, in step S903, that the operation unit 207 is in a normal state (including a case where the operation unit 207 is returned from an abnormal state to the normal state) and the processing in the flowchart ends.

Figure 22:
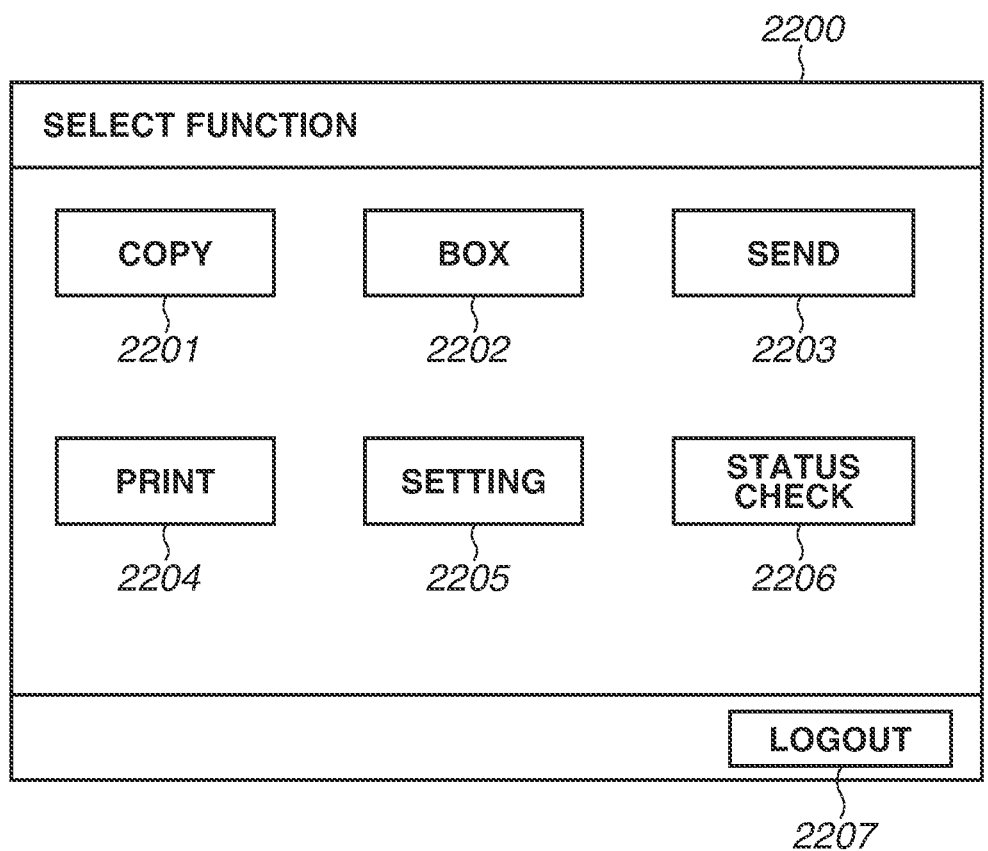
FIG. 22 illustrates an example of a function selection screen of the image forming apparatus.

As the screen after a login, a function list screen 2200 in FIG. 22 is displayed on the operation unit 207 by the UI control unit 302. Function buttons 2201 to 2206 and a logout button 2207 are displayed on the function list screen 2200. The function buttons include a copy button 2201, a box button 2202, a send button 2203, a print button 2204, a setting button 2205, and a status check button 2206. By the user pressing any of the function buttons, the screen transitions to a screen corresponding to each of the functions.

Figure 23:
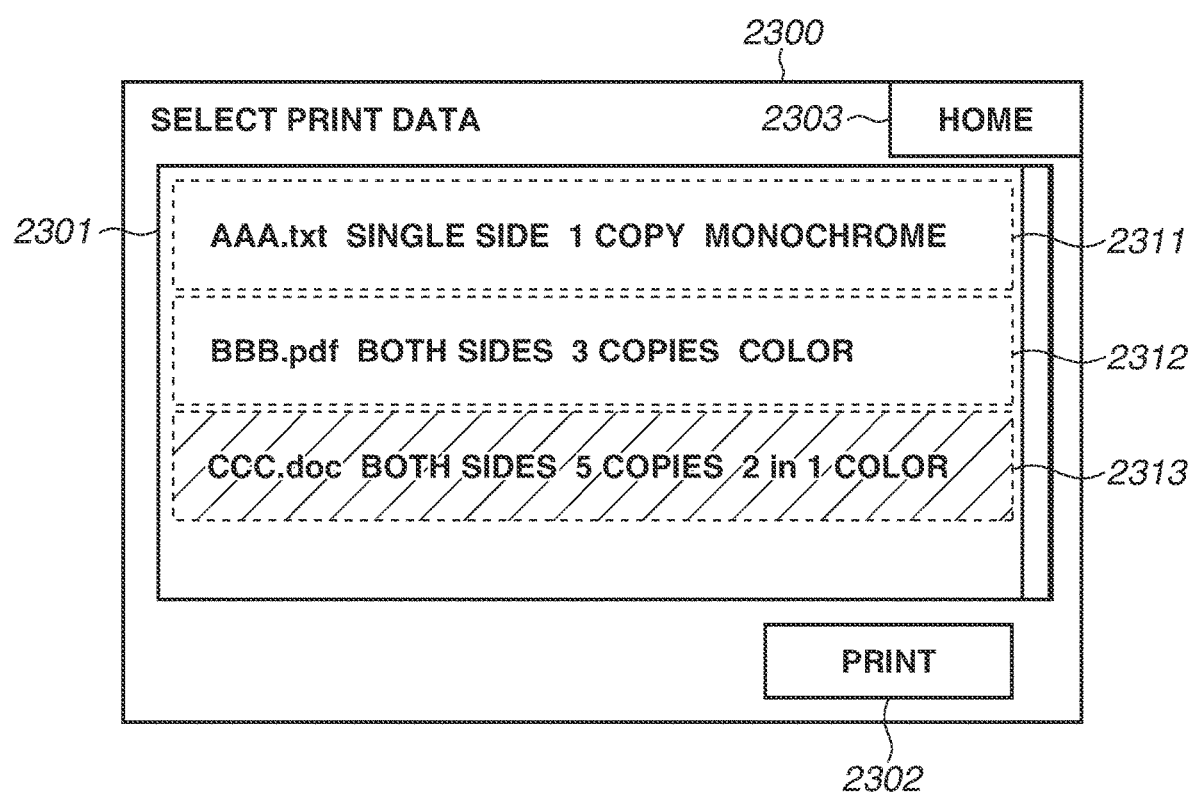
FIG. 23 illustrates an example of a print function screen of the image forming apparatus.

If the user presses the print button 2204, the UI control unit 302 switches the display of the operation unit 207 to a print function screen 2300 in FIG. 23. At this time, the authentication unit 303 provides the information about the login user to the UI control unit 302. The UI control unit 302 acquires, from the data management unit 304, the list of the bibliographic information associated with the provided information about the login user, and displays the acquired bibliographic information as a print object list 2301. For example, in the case of the bibliographic information table 801 in FIG. 8, a list including print data 2311 to 2313 in FIG. 23 is displayed. In a case where the number of pieces of acquired bibliographic information is zero, the list of bibliographic information is not displayed.

The user operates the operation unit 207 to select the bibliographic information to be printed from the print object list 2301. If the user selects the print data, the UI control unit 302 switches the display of the operation unit 207 in such a manner that a selected state is recognizable as with the print data 2313. If the user presses a print button 2302 in a state where the desired print data is selected, the UI control unit 302 requests the job management unit 307 to perform printing based on the bibliographic information about the selected print data. Then, the print data requested to be printed disappears from the print object list 2301. The user who has completed printing of the desired print data presses a home button 2303 to return to the function list screen 2200, and then presses a logout button 2207 to log out.

In the descriptions above, the screen transitions to the print function screen 2300 in response to the user operation after the function list screen 2200 is displayed. However, the print function screen 2300 may also be displayed directly after a login. As described above, a screen to be first displayed after a login is set by the user in advance.

Figure 10:
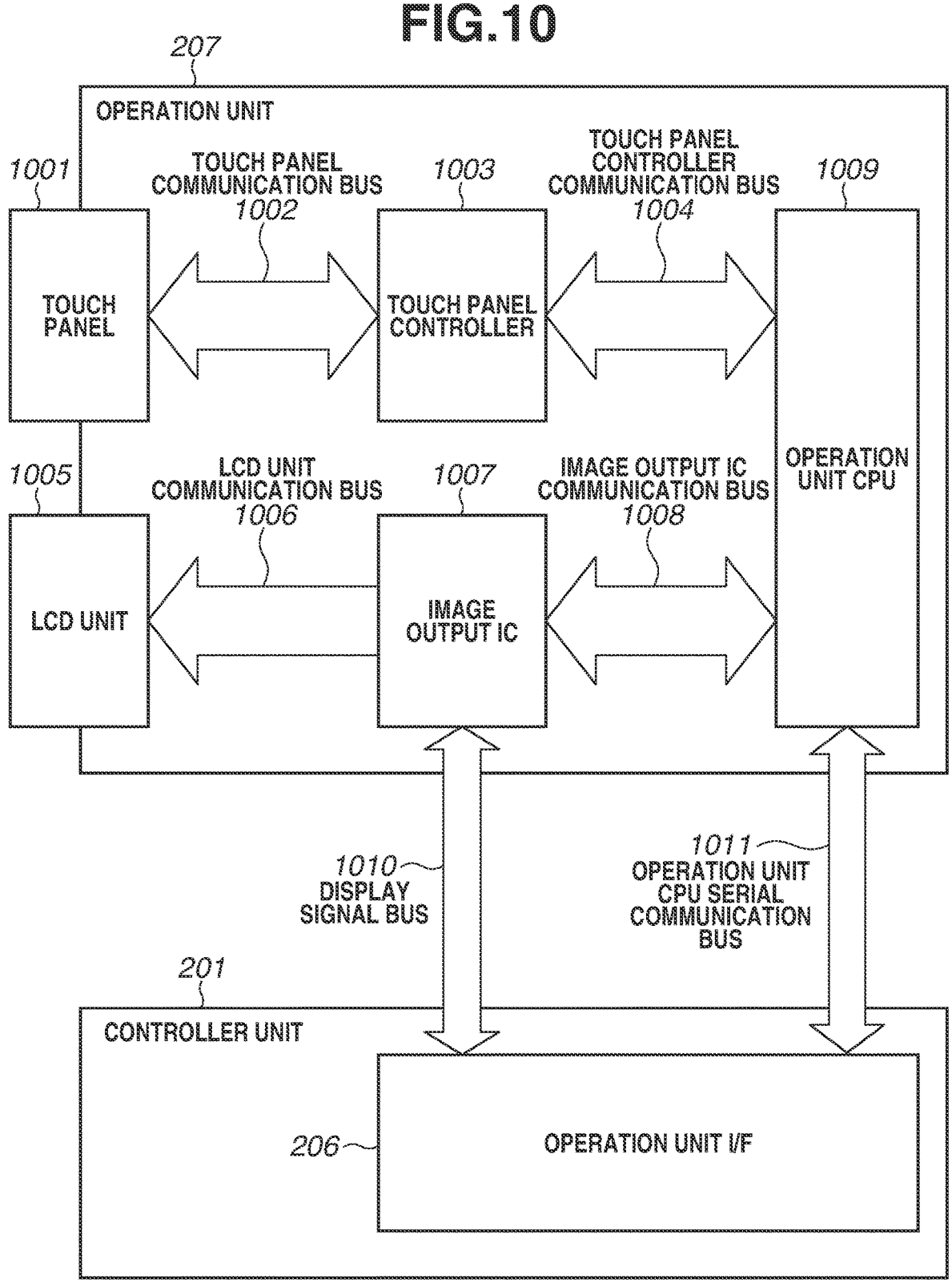
FIG. 10 is a block diagram illustrating an internal configuration of an operation unit of the image forming apparatus.

FIG. 10 is a block diagram illustrating an internal configuration of the operation unit 207 and a connection configuration with the controller unit 201.

A touch panel 1001 is made of a material having high transparency, and is disposed on a surface of the operation unit 207. A liquid crystal display (LCD) unit 1005 is disposed immediately below the touch panel 1001, and displays a graphical user interface screen to enable the user to perform touch input on the touch panel 1001. A touch panel controller 1003 is connected with and communicates with the touch panel 1001 via a touch panel communication bus 1002, thereby acquiring the user operation on the touch panel 1001 as a coordinate value. An image output IC 1007 is connected with and communicates with the LCD unit 1005 via an LCD unit communication bus 1006, thereby outputting image data for screen display to the LCD unit 1005. An operation unit CPU 1009 is connected with and communicates with the touch panel controller 1003 via a touch panel controller communication bus 1004, and is connected with and communicates with the image output IC 1007 via an image output IC communication bus 1008. The operation unit 207 is connected with the operation unit I/F 206 of the controller unit 201 via a display signal bus 1010 and an operation unit CPU serial communication bus 1011. The image data for screen display generated by using the system software 301 executed by the CPU 202 of the controller unit 201 is transmitted to the image output IC 1007 via the display signal bus 1010. Further, the system software 301 instructs, via the operation unit CPU serial communication bus 1011, the operation unit CPU 1009 to control the operation unit, and simultaneously acquires the coordinate value of the user operation on the touch panel 1001.

Figure 11:
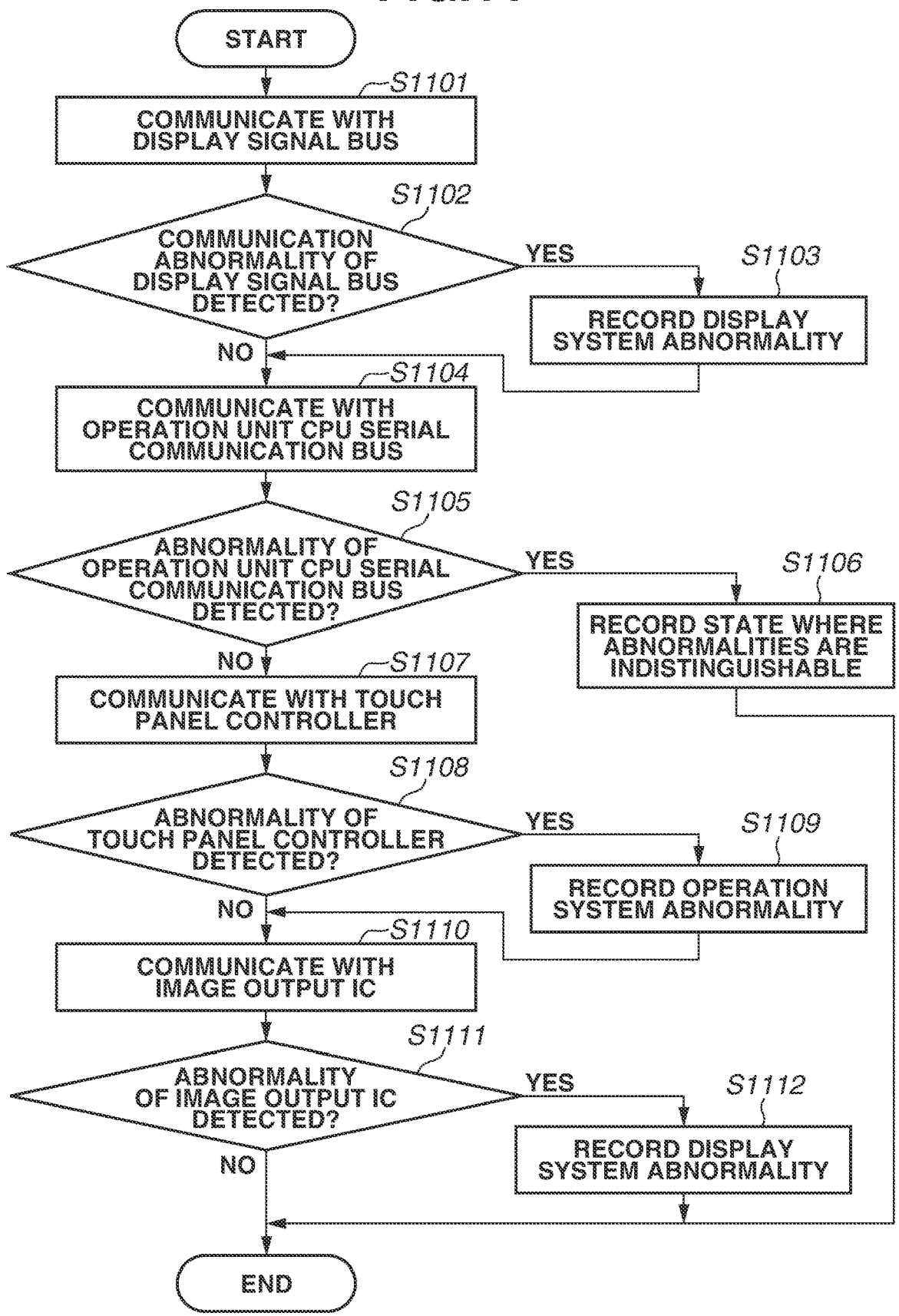
FIG. 11 is a flowchart illustrating processing to detect abnormality of the operation unit of the image forming apparatus.

FIG. 11 is a flowchart illustrating a flow of processing to detect an operation abnormality of the operation unit 207. The processing is performed by the system software 301 executed by the CPU 202 of the controller unit 201. The processing can be executed at any timing, and is executed, for example, when the image forming apparatus 102 is started up, when a state is returned from a sleep state, when the screen of the operation unit 207 is drawn, or when the user is successfully authenticated.

In step S1101, the system software 301 communicates with the display signal bus 1010. In step S1102, the system software 301 checks whether the communication is normal. In a case where an abnormality of the communication is detected (YES in step S1102), the image data for screen display cannot be correctly transmitted via the display signal bus 1010. Thus, in step S1103, an abnormality of the display system is recorded in the RAM 203.

Next, in step S1104, the system software 301 communicates with the operation unit CPU serial communication bus 1011. In step S1105, the system software 301 checks whether the communication is normal. In a case where an abnormality of the communication is detected (YES in step S1105), the operation unit control instruction and acquisition of the coordinate value of the user operation cannot be correctly performed via the operation unit CPU serial communication bus 1011. Thus, in step S1106, the abnormality of the operation unit is recorded in the RAM 203. At this time, a state where an abnormality of the display system and an abnormality of the operation system are indistinguishable is recorded, and the abnormality detection processing ends. In a case where the communication with the operation unit CPU serial communication bus 1011 is normal in step S1105 (NO in step S1105), the processing proceeds to detail confirmation processing in and after step S1107.

In step S1107, the system software 301 transmits, to the operation unit CPU 1009 via the operation unit CPU serial communication bus 1011, an instruction to check whether the operation unit CPU 1009 correctly controls the touch panel controller 1003. The operation unit CPU 1009 communicates with the touch panel controller 1003 via the touch panel controller communication bus 1004. In a case where an abnormality is detected, the operation unit CPU 1009 notifies the system software 301 of the abnormality via the operation unit CPU serial communication bus 1011. In step S1108, in a case where the system software 301 confirms detection of the abnormality of the touch panel controller 1003 (YES in step S1108), in step S1109, an operation system abnormality in which the coordinate value of the user operation cannot be correctly acquired is recorded in the RAM 203.

Next, in step S1110, the system software 301 transmits, to the operation unit CPU 1009 via the operation unit CPU serial communication bus 1011, an instruction to check whether the operation unit CPU 1009 correctly controls the image output IC 1007. The operation unit CPU 1009 communicates with the image output IC 1007 via the image output IC communication bus 1008. In a case where an abnormality is detected, the operation unit CPU 1009 notifies the system software 301 of the abnormality via the operation unit CPU serial communication bus 1011. In step S111, in a case where the system software 301 confirms detection of the abnormality of the image output IC 1007 (YES in step S111), in step S1112, a display system abnormality in which screen display cannot be correctly performed is recorded in the RAM 203, and the abnormality detection processing ends. As described above, in the case where the abnormality of the operation unit 207 is detected, the detection result is stored in the RAM 203 and is used in the above-described determination processing in step S903 of FIG. 9.

According to the present exemplary embodiment, in the case where the abnormality of the operation unit 207 is detected when a login by the user is detected, printing based on the print job of the hold printing associated with the login user is automatically performed. As a result, even in the case where the list of print jobs cannot be displayed due to the abnormality of the operation unit 207, or even in the case where the list of print jobs can be displayed but the print job cannot be selected, the user can print the held print job by holding the IC card over a card reader to log in. Accordingly, even in the case where various functions of the image forming apparatus cannot be used due to failure of the operation unit 207, the user can perform printing based on the user's held print job as a minimum function. This improves usability of the user.

In the first exemplary embodiment, in the case where the operation unit 207 is in failure when the user logs in, the print job of the hold printing associated with the user is surely performed. Depending on an operation environment of the image forming apparatus, however, there may be cases where performing the hold printing automatically during the failure of the operation unit 207 is undesirable. Accordingly, in a second exemplary embodiment, an image forming apparatus in which whether to perform the automatic printing during the failure of the operation unit is switchable is described.

Figure 12:
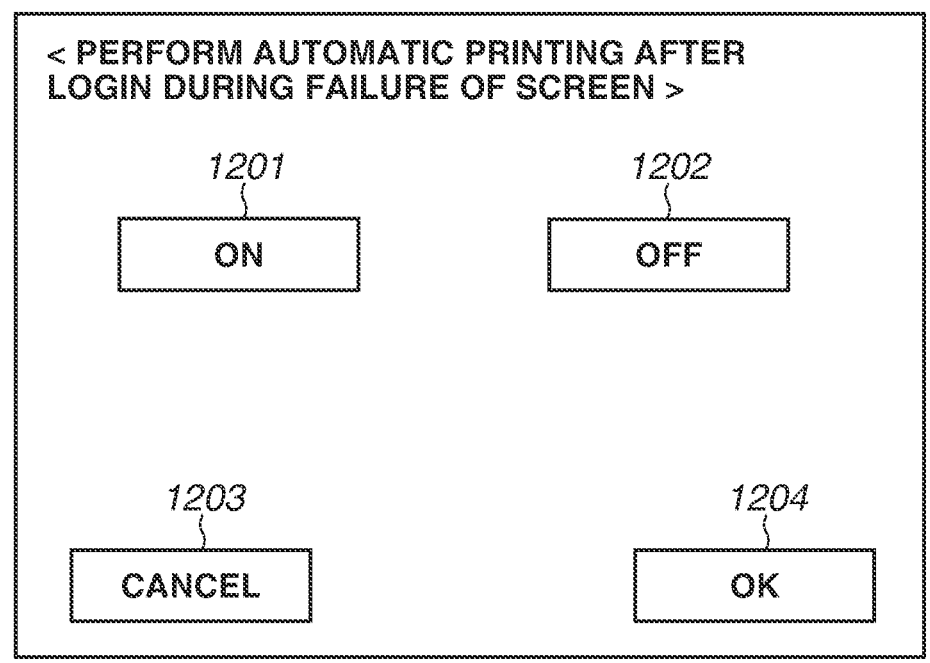
FIG. 12 illustrates a setting screen of automatic printing after a login according to a second exemplary embodiment.

FIG. 12 illustrates a menu screen to set whether to perform the automatic printing during the failure of the operation unit, and the menu screen is displayed on the operation unit 207 of the image forming apparatus 102. By pressing an ON button 1201 or an OFF button 1202 and then pressing an OK button 1204, the user can change an enabled/disabled state of each setting. Further, by pressing a cancel button 1203, the user can cancel the change of the setting. Contents changed by using the menu in FIG. 12 are stored as the setting of the image forming apparatus 102 in the RAM 203 or the HDD 205. An administrator user can make the setting in anticipation of the failure of the operation unit 207 in advance.

Figure 13:
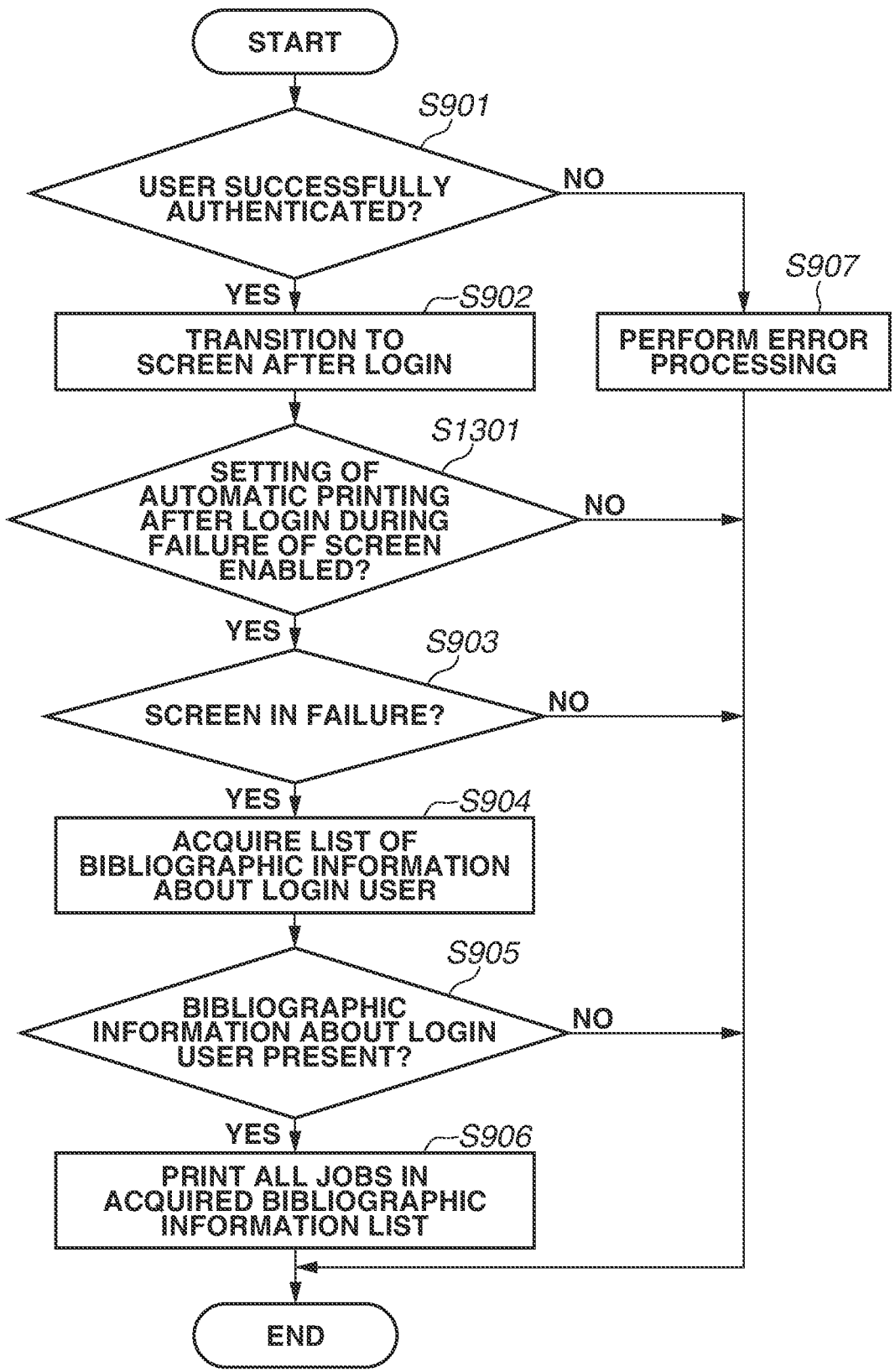
FIG. 13 is a flowchart illustrating the automatic printing after a login according to the second exemplary embodiment.

FIG. 13 is a flowchart illustrating the print processing when the user is authenticated. The processing is performed by the system software 301 executed by the CPU 202 of the controller unit 201. The flowchart of FIG. 13 includes processing similar to the processing in FIG. 9. Thus, only processing different from the processing in FIG. 9 is described herein.

In step S902, the UI control unit 302 transitions the screen to the screen after a login. Then, the processing proceeds to step S1301. In step S1301, a setting value indicating whether to perform the automatic printing during the failure of the operation unit is read from the RAM 203 or the HDD 205. In a case where the setting has been enabled (YES in step S1301), the processing proceeds to step S903. In a case where the setting has been disabled (NO in step S1301), the processing ends.

According to the present exemplary embodiment, whether to perform the automatic printing during the failure of the operation unit can be set in advance. This makes it possible to perform appropriate operation corresponding to an installation environment of the image forming apparatus.

An image forming apparatus according to a third exemplary embodiment includes a function of automatic printing after a login in which the print job of the hold printing associated with the login user is automatically performed when the user logs in irrespective of presence/absence of the failure of the operation unit 207. In the present exemplary embodiment, an example is described in which the setting of the automatic printing after a login is enabled at a timing when the failure of the operation unit 207 is detected, and determination on whether to perform the automatic printing is made only by checking the setting when the user logs in.

Figure 14:
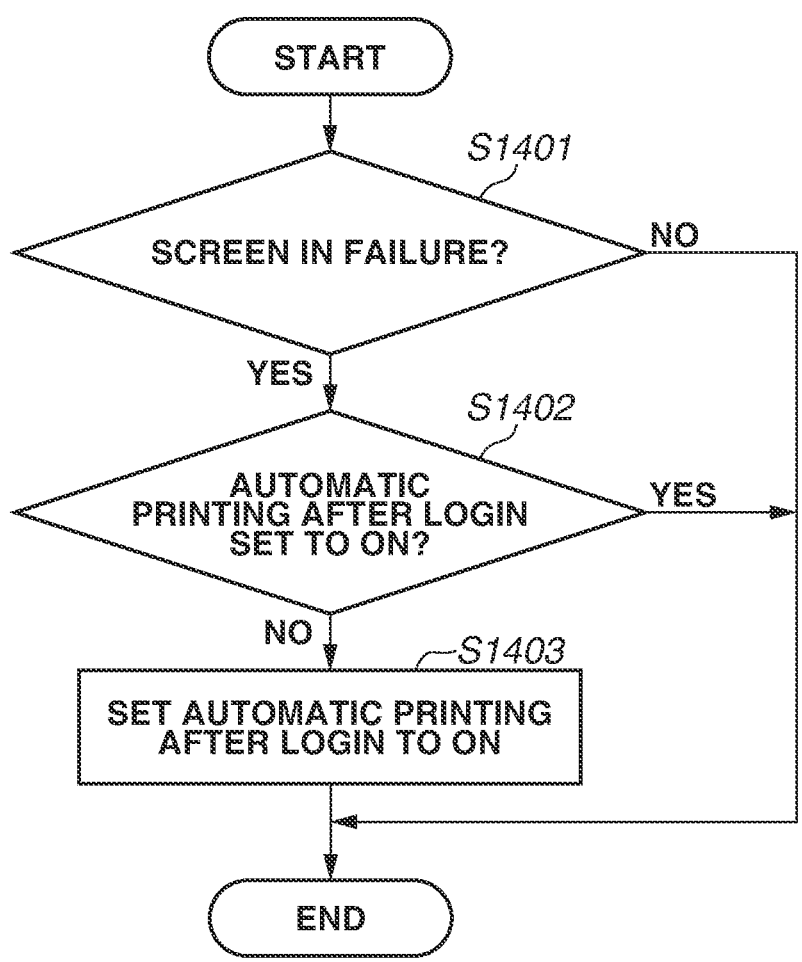
FIG. 14 is a flowchart illustrating processing to enable setting of automatic printing after a login according to a third exemplary embodiment.

FIG. 14 is a flowchart illustrating a flow of processing to enable the setting of the automatic printing after a login when an operation abnormality of the operation unit 207 is detected through the processing in the flowchart of FIG. 11. The processing in FIG. 14 is performed by the system software 301 executed by the CPU 202 of the controller unit 201.

After the system software 301 detects the failure, in step S1401, it is determined whether the operation unit 207 is in failure. In a case where the operation unit 207 is in failure (YES in step S1401), in step S1402, it is checked whether the automatic printing after a login has been set to on. The automatic printing after a login can be set to on or off by the administrator user on a setting screen (not illustrated), and the set contents are stored in the RAM 203 or the HDD 205. In a case where the automatic printing after a login has been set to off (NO in step S1402), in step S1403, the automatic printing after a login is set to on. The changed contents are stored as the setting of the image forming apparatus 102 in the RAM 203 or the HDD 205. In a case where the operation unit 207 is not in failure (NO in step S1401) or in a case where the operation unit 207 is in failure but the automatic printing after a login has been already set to on (YES in step S1402), the processing ends.

Figure 15:
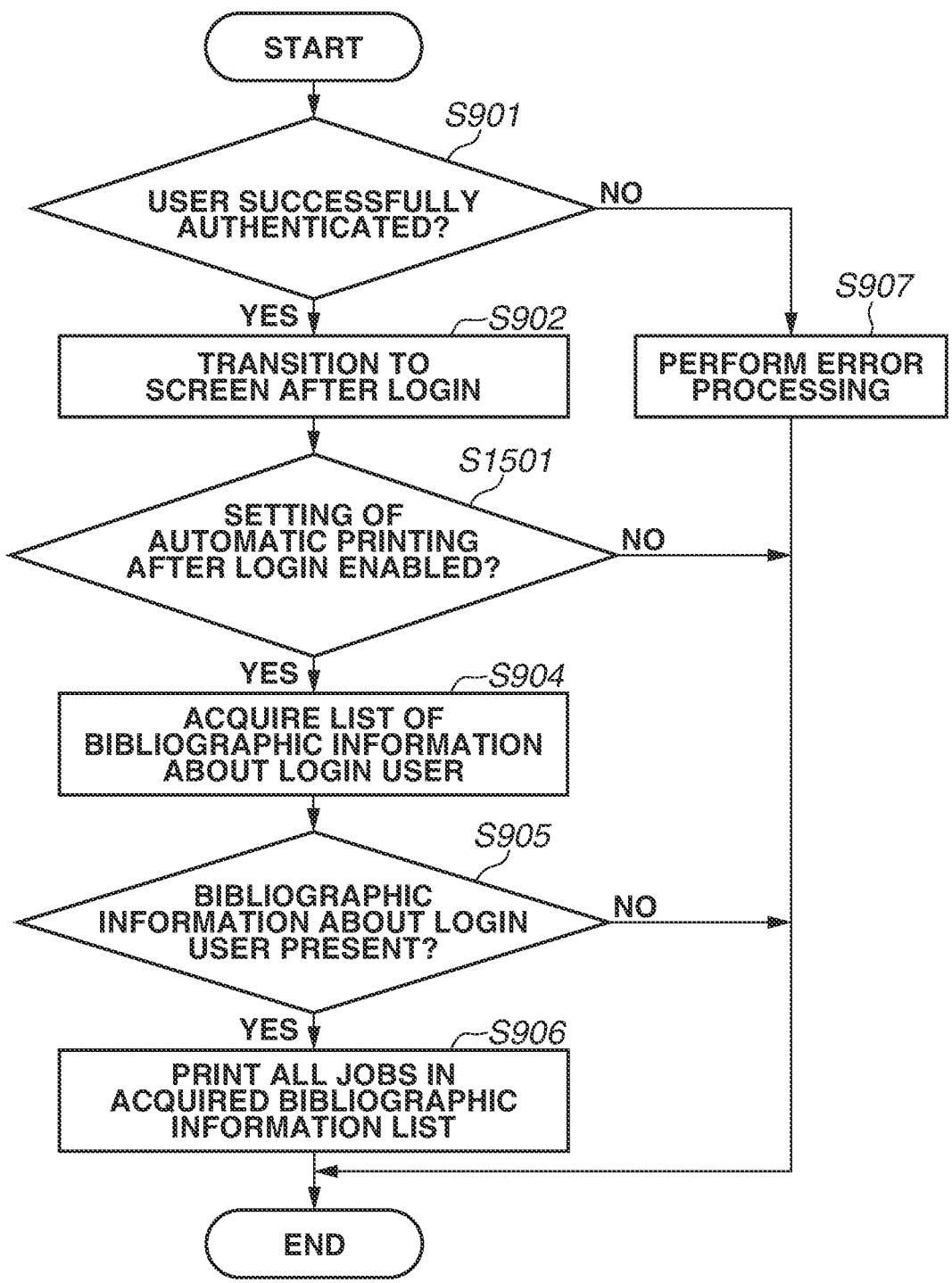
FIG. 15 is a flowchart illustrating the automatic printing after a login according to the third exemplary embodiment.

FIG. 15 is a flowchart illustrating the print processing when the user is authenticated. The processing is performed by the system software 301 executed by the CPU 202 of the controller unit 201. The flowchart of FIG. 15 includes processing similar to the processing in FIG. 9. Thus, only processing different from the processing in FIG. 9 is described herein.

In step S902, the UI control unit 302 transitions the screen to the screen after a login. Then, the processing proceeds to step S1501. In step S1501, a setting value indicating whether to perform the automatic printing after a login is read from the RAM 203 or the HDD 205. In a case where the setting has been enabled (YES in step S1501), the processing proceeds to step S904. In a case where the setting has been disabled (NO in step S1501) the processing ends.

According to the present exemplary embodiment, the setting of the function of the automatic printing after a login is enabled if an abnormality of the operation unit 207 is detected, which makes it possible to achieve the automatic printing during the failure of the operation unit.

In a case where the setting of the automatic printing after a login is changed from the disabled state to the enabled state when the abnormality of the operation unit 207 is detected, the setting of the automatic printing after a login may be returned to the disabled state in response to detection that the operation unit 207 is returned from the abnormal state to the normal state. As a result, in the case of the setting in which the user selects and prints the print job without performing the automatic printing after a login in the normal state, the state can be returned to an original state at the time when the failure of the operation unit 207 is eliminated.

In each of the above-described exemplary embodiments, after the user logs in, there are cases where the user is unable to notice that the user is still in the logged-in state due to failure of the display system of the operation unit 207 and where the user cannot perform a logout operation due to failure of the operation system of the operation unit 207. As a result, the user remains to be in the logged-in state, and the next user cannot immediately perform the held print. Thus, in a fourth exemplary embodiment, processing to perform a logout immediately after performing the automatic printing during the failure of the operation unit is described.

Figure 16A:
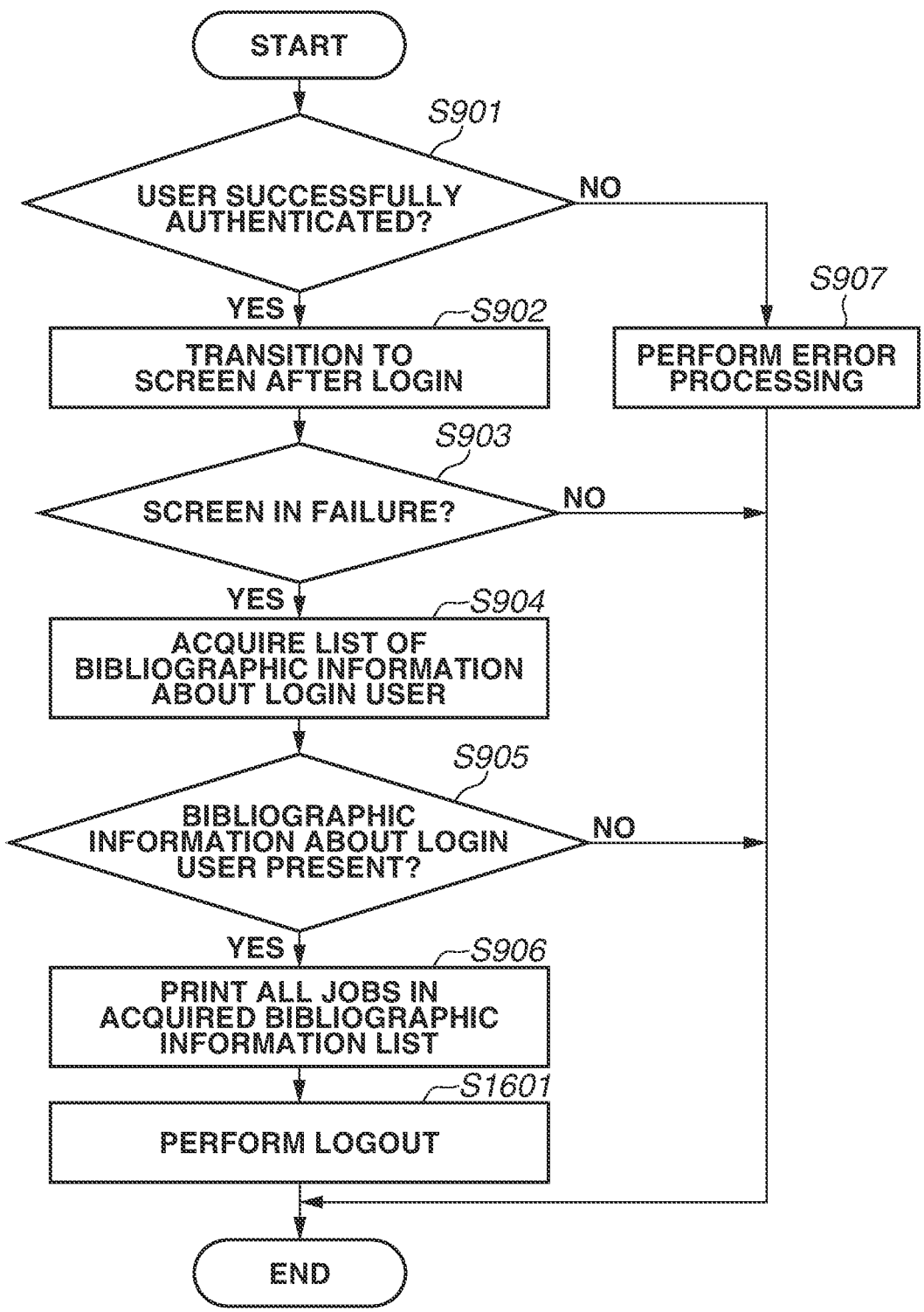
FIGS. 16A and 16B are flowcharts each illustrating automatic printing after a login according to a fourth exemplary embodiment.
Figure 16B:
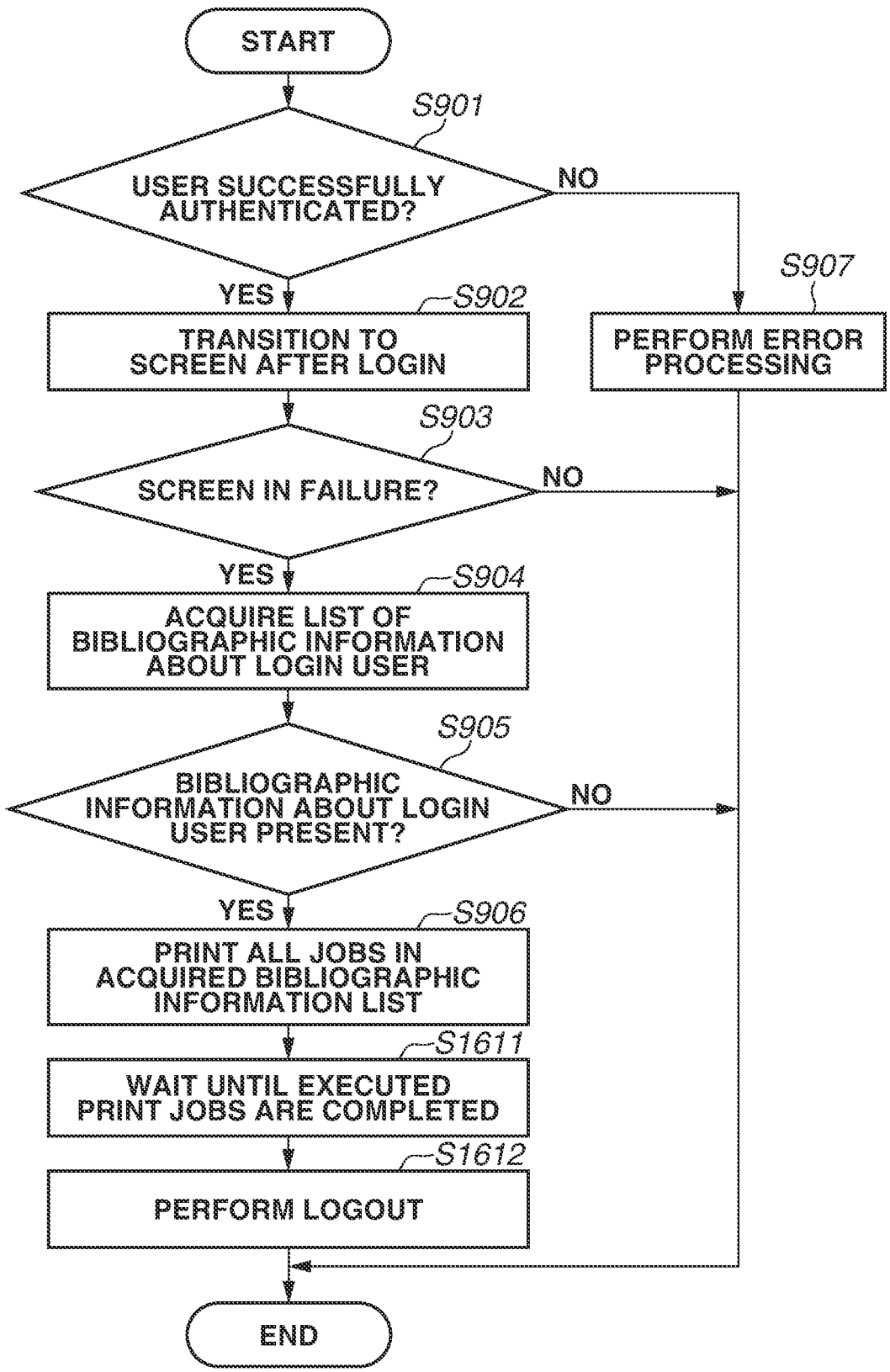

FIGS. 16A and 16B are flowcharts each illustrating the print processing when the user is authenticated. The processing is performed by the system software 301 executed by the CPU 202 of the controller unit 201. The flowcharts of FIGS. 16A and 16B each include processing similar to the processing in FIG. 9. Thus, only processing different from the processing in FIG. 9 is described. The flowcharts in FIGS. 16A and 16B are different in terms of logout timing.

In FIG. 16A, after the UI control unit 302 requests the job management unit 307 to perform printing based on the acquired bibliographic information in step S906, in step S1601, the UI control unit 302 performs a logout to transition the screen displayed on the operation unit 207 to the screen before the login. Then, the processing in the flowchart ends.

In FIG. 16B, after the UI control unit 302 requests the job management unit 307 to perform printing based on the acquired bibliographic information in step S906, in step S1611, the processing waits until all of the executed print jobs are completed. After all of the print jobs are completed, in step S1612, the UI control unit 302 performs a logout to transition the screen displayed on the operation unit 207 to the screen before the login. Then, the processing ends.

As described above, in FIG. 16A, the user is logged out when the printing of the print jobs associated with the login user is requested. On the other hand, in FIG. 16B, the user is not logged out when the printing of the print jobs associated with the login user is requested, but the user is logged out when the print jobs are completed.

According to the present exemplary embodiment, after the user logs in, the user is logged out immediately after the print job of the hold printing is automatically performed. This enables the next user to perform printing immediately.

In the fourth exemplary embodiment, the login user is logged out immediately after the automatic printing during the failure of the operation unit is performed, whereby another user can log in. This is based on an assumption that the other user cannot log in to the image forming apparatus even if the other user holds the IC card over a card reader as long as the user is logged in to the image forming apparatus. In an image forming apparatus according to a fifth exemplary embodiment, a setting to permit a login of another user while the user is logged in can be enabled or disabled. If the setting is enabled, even if the user is logged in, by the other user holding the IC card over a card reader, the login user is logged out, and the other user is logged in. In the present exemplary embodiment, processing to enable the setting to permit a login of another user while the user is logged in at timing when the failure of the operation unit 207 is detected is described.

Figure 17:
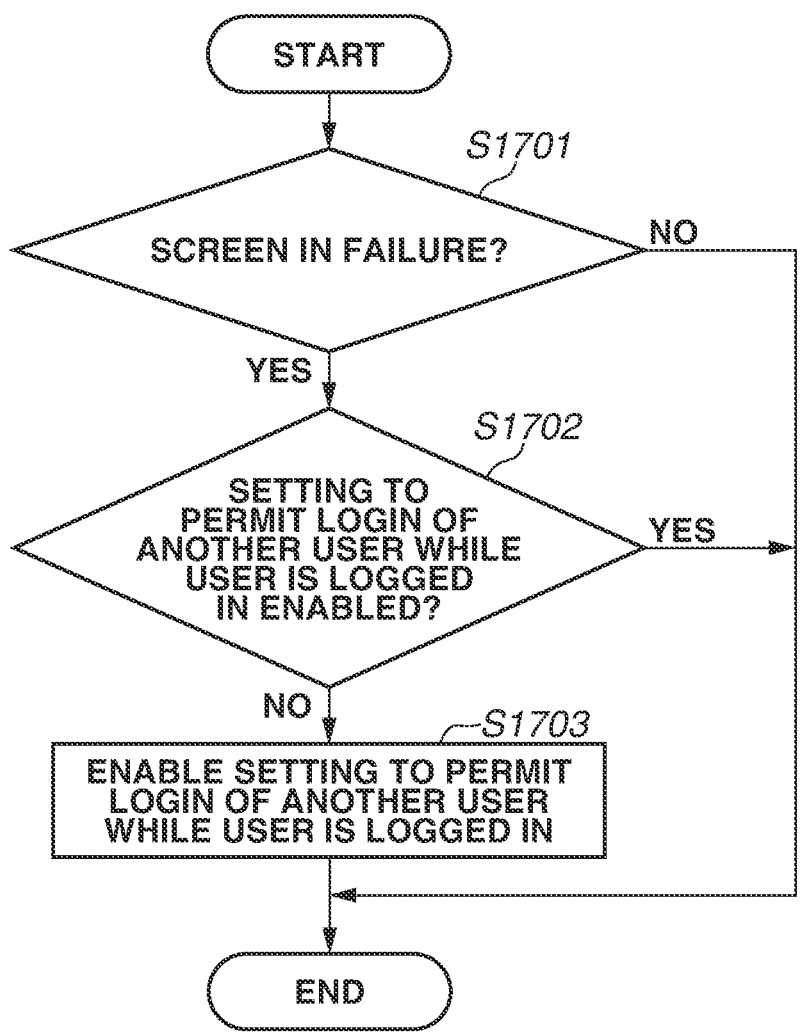
FIG. 17 is a flowchart illustrating processing to enable a setting to permit a login according to a fifth exemplary embodiment.

FIG. 17 is a flowchart illustrating a flow of the processing to enable the setting to permit a login of another user while the user is logged in when an operation abnormality of the operation unit 207 is detected by the processing in the flowchart of FIG. 11. The processing in FIG. 17 is performed by the system software 301 executed by the CPU 202 of the controller unit 201.

After the system software 301 detects the failure, in step S1701, it is determined whether the operation unit 207 is in failure. In a case where the operation unit 207 is in failure (YES in step S1701), in step S1702, it is checked whether the setting to permit a login of another user while the user is logged in has been enabled. The setting can be enabled or disabled by the administrator user on a setting screen (not illustrated), and the set contents are stored in the RAM 203 or the HDD 205. In a case where the setting to permit a login of another user while the user is logged in has been disabled (NO in step S1702), in step S1703, the setting is enabled, and the processing ends. The changed contents are stored as the setting of the image forming apparatus 102 in the RAM 203 or the HDD 205. In the case where the operation unit 207 is not in failure (NO in step S1701) or in a case where the operation unit 207 is in failure but the setting to permit a login of another user while the user is logged in has already been enabled (YES in step S1702), the processing ends.

According to the present exemplary embodiment, the setting to permit a login of another user while the user is logged in is enabled during the failure of the operation unit 207. Accordingly, even in the cases where the user is unable to notice that the user is still in the logged-in state due to the failure of the display system or where the user cannot perform a logout operation due to the failure of the operation system, the next user can log in by holding the IC card over a card reader. As a result, the held print job associated with the next user can be immediately executed.

In the case where the setting to permit a login of another user while the user is logged in is changed from the disabled state to the enabled state when the abnormality of the operation unit 207 is detected, the setting may be returned to the disabled state in response to detection that the operation unit 207 is returned from the abnormal state to the normal state. As a result, in a case where the setting to permit a login of another user while the user is logged in is not set in the normal state, the state can be returned to an original state at the time when the failure of the operation unit 207 is corrected.

In a sixth exemplary embodiment, processing to notify the user of a job status depending on the failure of the display system or the failure of the operation system when the automatic printing during the failure of the operation unit is performed is described.

FIG. 18 illustrates a screen 1800 that displays a status of a job waiting for execution during execution of the printing, and the screen 1800 is displayed on the operation unit 207 of the image forming apparatus 102.

The job status check screen 1800 represents the job execution status when the print jobs illustrated in the example of FIG. 8 are executed. An execution time, a job name, an input user name, an execution status, and the like of each of the print jobs are displayed on the job status check screen 1800, and the display is updated in response to a change (update) of the job execution status.

Figure 19:
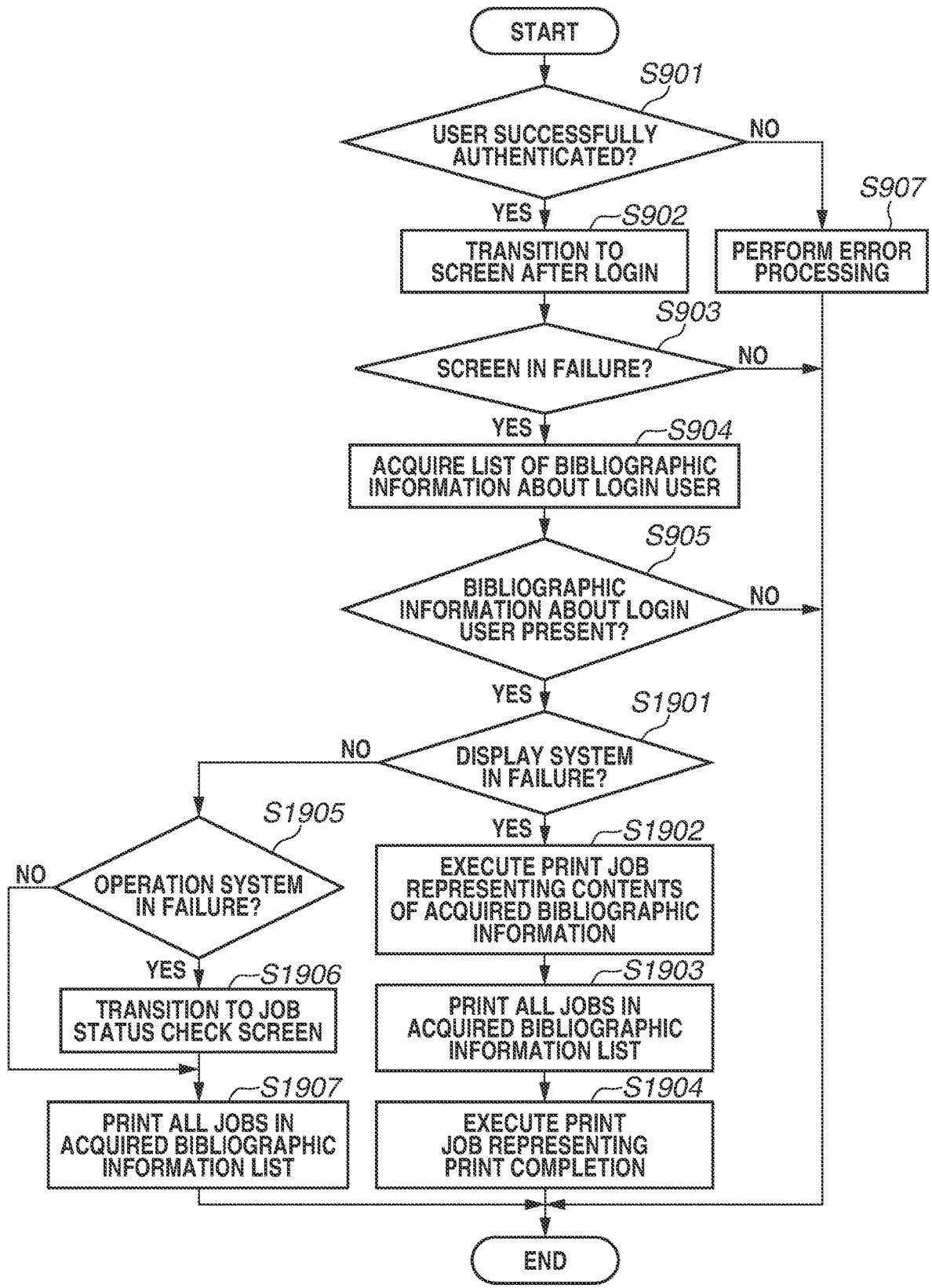
FIG. 19 is a flowchart illustrating automatic printing after a login according to the sixth exemplary embodiment.

FIG. 19 is a flowchart illustrating the print processing when the user is authenticated. The processing is performed by the system software 301 executed by the CPU 202 of the controller unit 201. The flowchart of FIG. 19 includes processing similar to the processing in FIG. 9. Thus, only processing different from the processing in FIG. 9 is described.

In step S905, the UI control unit 302 checks whether the bibliographic information is present. In a case where the bibliographic information is present (YES in step S905), the processing proceeds to step S1901. In step S1901, the UI control unit 302 determines whether the display system of the operation unit 207 is in failure. In a case where the display system is in failure (YES in step S1901), in step S1902, the UI control unit 302 requests the job management unit 307 to print the print job representing contents of the acquired bibliographic information. As a result, a list of print jobs to be printed is printed. Then, in step S1903, the UI control unit 302 requests the job management unit 307 to perform printing based on the acquired bibliographic information. In step S1904, the UI control unit 302 requests the job management unit 307 to print a print job representing print completion. As a result, information representing the print completion is printed. As described above, even in a case where the user is unable to see the job status on the operation unit 207 due to the failure of the display system, the user can find contents of the print job to be printed and whether the printing is completed by checking the printed sheet.

In step S1901, in a case where it is determined that the display system of the operation unit 207 is not in failure (NO in step S1901), in step S1905, it is determined whether the operation system is in failure. In a case where the operation system is in failure (YES in step S1905), the processing proceeds to step S1906. Otherwise (NO in step S1905), the processing proceeds to step S1907. In step S1906, the UI control unit 302 transitions the screen displayed on the operation unit 207 to the job status check screen such as the screen 1800. In step S1907, the UI control unit 302 requests the job management unit 307 to perform printing based on the acquired bibliographic information, and the processing ends. As described above, in the case where the user operation cannot be received due to the failure of the operation system but the display system is not in failure, a job execution status screen is displayed to enable the user to check the execution status of the print job.

As described above, according to the present exemplary embodiment, the information about the print job is presented to the user on the printed sheet in the case where the display system of the operation unit 207 is in failure and on the screen in the case where the operation system of the operation unit 207 is in failure. This enables the user to check the contents of the job to be printed and whether the printing is completed.

In a seventh exemplary embodiment, an example is described in which execution of the automatic printing after a login when the operation unit 207 is in failure is notified to the user before the user logs in.

Figure 20:
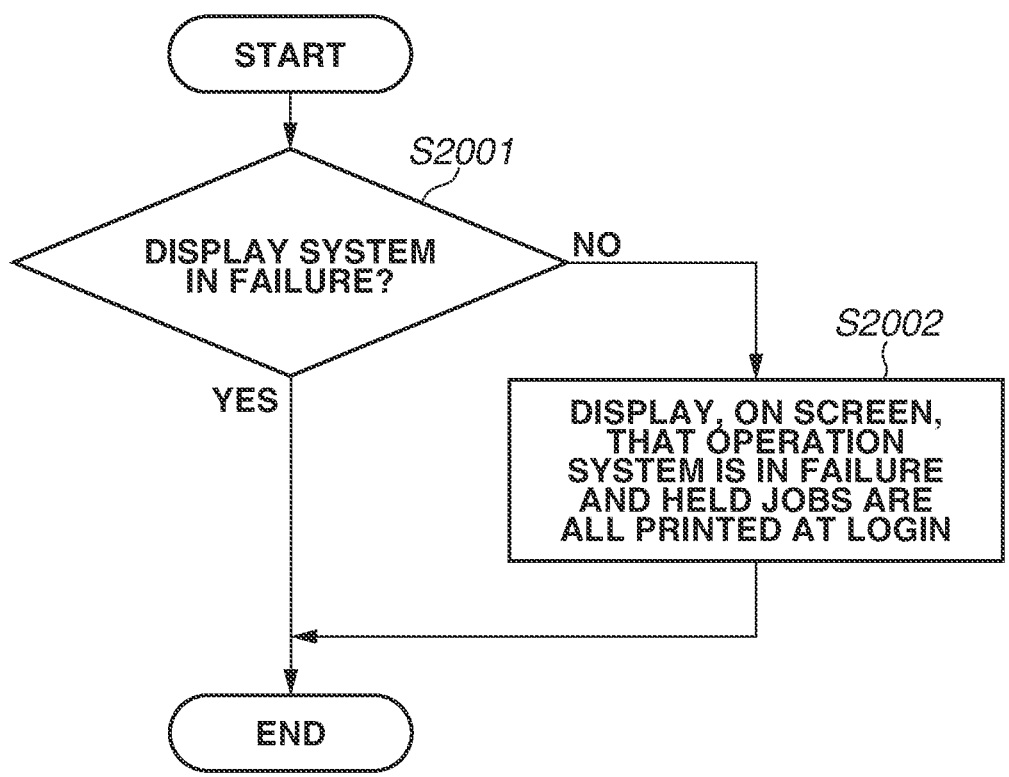
FIG. 20 is a flowchart illustrating processing to switch screen display according to a seventh exemplary embodiment.

FIG. 20 is a flowchart illustrating a flow of processing to switch the display of the operation unit 207 after an operation abnormality of the operation unit 207 is detected by the processing in the flowchart of FIG. 11.

Figure 21:
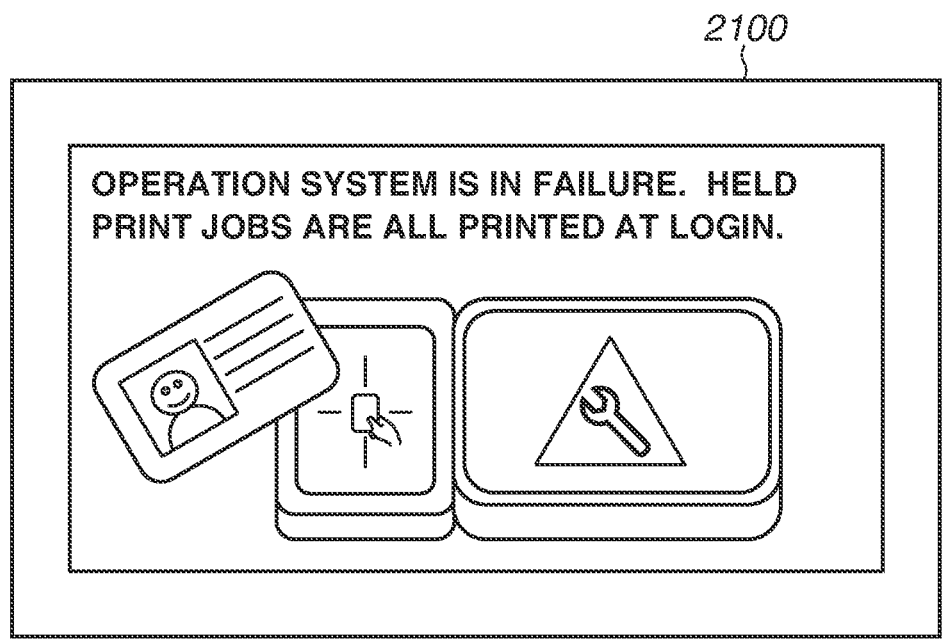
FIG. 21 illustrates an example of a screen when failure of a screen is detected according to the seventh exemplary embodiment.

After the system software 301 detects the failure, in step S2001, it is determined whether the display system of the operation unit 207 is in failure. In a case where the display system of the operation unit 207 is in failure (YES in step S2001), the processing ends. On the other hand, in a case where the display system of the operation unit 207 is not in failure (NO in step S2001), in step S2002, the screen displayed on the operation unit 207 is transitioned to a screen 2100 in FIG. 21. The screen 2100 displays that the operation system is in failure and the held print jobs are all printed at a login.

According to the present exemplary embodiment, the display of the operation unit 207 is switched at timing when the failure of the operation unit 207 is detected, which enables the user to recognize that the held print jobs are executed at a login.

Other Embodiments

The above-described exemplary embodiments are provided to more specifically describe the present disclosure, and the scope of the present disclosure is not limited to these exemplary embodiments. Various modes not departing from the scope of the present disclosure are also included in the present disclosure, and for example, a part of the above-described exemplary embodiments may be appropriately combined together.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-006203, filed Jan. 17, 2019, which is hereby incorporated by reference herein in its entirety.

What is claimed is:

1. An image forming apparatus, comprising:
an operation unit;
one or more memories, and
one or more processors that execute a set of instructions to:
store a print job in association with user information in the one or more memories;
receive authentication information of a user; and
execute the print job stored in association with user information of the user based on success of authentication process by use of the authentication information of the user and an operation of the user received by the operation unit,
wherein, in a case where the operation unit is in failure, the print job stored in association with the user information of the user is executed based on success of authentication process by use of the authentication information of the user without receiving the operation of the user by the operation unit.

2. The image forming apparatus according to claim 1, wherein the one or more processors further execute the set of instructions to set whether to execute the print job stored in association with the user information of the user without receiving the operation of the user by the operation unit in the case where the operation unit is in failure.

3. The image forming apparatus according to claim 2, wherein the print job is executed based on contents of the setting, and wherein the one or more processors further execute the set of instructions to log out the user who has logged in to the image forming apparatus.

4. The image forming apparatus according to claim 1, wherein the one or more processors further execute the set of instructions to set whether to permit another user to log in while the user is logged in,
wherein, in a case where the operation unit is in failure, setting is changed to permit the another user to log in to the image forming apparatus to which the user is logged in.

5. The image forming apparatus according to claim 1, wherein notification is displayed on the operation unit, and wherein the notification is that the print job stored in association with the user who has logged in is executed when the user logs in to the image forming apparatus.

6. The image forming apparatus according to claim 1,
wherein the operation unit includes at least a display unit that displays a screen and a touch panel that receives the user operation, and
wherein the one or more processors further execute the set of instructions to determine whether at least one of the display unit or the touch panel is in failure.

7. The image forming apparatus according to claim 1, wherein the operation of the user received by the operation unit includes at least one of an operation for selecting a print job or an operation of a print instruction.

8. The image forming apparatus according to claim 1, wherein the operation of the user is received by the operation unit after success of authentication process by use of the authentication information of the user.

9. The image forming apparatus according to claim 1, wherein the operation of the user is received via a screen which is displayed after success of authentication process by use of the authentication information of the user.

10. The image forming apparatus according to claim 1, wherein, in a case where the operation unit is not in failure, the print job stored in association with user information of the user is executed based on success of authentication process by use of the authentication information of the user and an operation of the user received by the operation unit.

11. A non-transitory computer readable storage medium storing a computer program for making a computer execute a control method for an image forming apparatus which comprises an operation unit configured to receive a user operation, the control method comprising:
storing a print job in association with user information;
receiving authentication information of a user; and
executing the print job stored in association with user information of the user based on success of authentication process by use of the authentication information of the user and an operation of the user received by the operation unit, wherein, in a case where the operation unit is in failure, the print job stored in association with the user information of the user is executed based on success of authentication process by use of the authentication information of the user without receiving the operation of the user by the operation unit.

12. The non-transitory computer readable storage medium according to claim 11, wherein the operation of the user received by the operation unit includes at least one of an operation for selecting a print job or an operation of a print instruction.

13. The non-transitory computer readable storage medium according to claim 11, wherein the operation of the user is received by the operation unit after success of authentication process by use of the authentication information of the user.

14. The non-transitory computer readable storage medium according to claim 11 wherein the operation of the user is received via a screen which is displayed based on success of authentication process by use of the authentication information of the user.

15. The non-transitory computer readable storage medium according to claim 11, wherein, in a case where the operation unit is not in failure, the print job stored in association with user information of the user is executed based on success of authentication process by use of the authentication information of the user and an operation of the user received by the operation unit.

16. An image forming apparatus, comprising:
an operation unit;
one or more memories, and
one or more processors that execute a set of instructions to:
　store a print job in association with user information in the one or more memories; and
　receive authentication information of a user;
　wherein, in a case where the operation unit is not in failure, execute the print job stored in association with user information of the user based on success of authentication process by use of the authentication information of the user and based on an operation of the user which is received via a screen displayed after success of authentication process by use of the authentication information of the user and which includes at least one of an operation for selecting a print job or an operation of a print instruction,
　wherein, in a case where the operation unit is in failure, the print job stored in association with the user information of the user is executed based on success of authentication process by use of the authentication information of the user without receiving the operation of the user.

* * * * *